United States Patent [19]
Morimoto et al.

[11] Patent Number: 5,835,619
[45] Date of Patent: Nov. 10, 1998

[54] METHOD OF PROCESSING A SECTIONAL IMAGE OF A SAMPLE BONE INCLUDING A CORTICAL BONE PORTION AND A CANCELLOUS BONE PORTION

[75] Inventors: Kenji Morimoto; Kanji Kurome, both of Ibaraki; Jiro Kita, Iwakuni; Tomohiro Oota, Hino, all of Japan

[73] Assignee: Teijin Limited, Osaka, Japan

[21] Appl. No.: 825,091

[22] Filed: Mar. 27, 1997

[30] Foreign Application Priority Data

| Mar. 29, 1996 | [JP] | Japan | 8-076430 |
| Apr. 5, 1996 | [JP] | Japan | 8-083940 |
| May 7, 1996 | [JP] | Japan | 8-112418 |

[51] Int. Cl.$^6$ .................................................. G06K 9/00
[52] U.S. Cl. .......................................... 382/132; 382/257
[58] Field of Search .................................. 382/128, 131, 382/132, 256, 257, 258, 259; 128/922

[56] References Cited

U.S. PATENT DOCUMENTS

| 4,903,203 | 2/1990 | Yamashita et al. | 364/413.15 |
| 5,228,068 | 7/1993 | Mazess | 378/54 |
| 5,327,262 | 7/1994 | Williams | 358/462 |
| 5,426,709 | 6/1995 | Yoshida et al. | 382/132 |
| 5,452,367 | 9/1995 | Bick et al. | 382/128 |
| 5,602,935 | 2/1997 | Yoshida et al. | 382/132 |

FOREIGN PATENT DOCUMENTS

| 0626656 | 11/1994 | European Pat. Off. | G06F 15/70 |
| WO95/14966 | 6/1995 | WIPO | G06F 159/00 |
| WO96/39936 | 12/1996 | WIPO | A61B 6/00 |

OTHER PUBLICATIONS

"Characterization of microstructural anisotropy in orthotopic materials using a second rank tensor"; *Journal of Materials Science*, T.P. Harrigan et al., vol. 19, 1984 pp. 761–767.

"A robust morphological algorithm for automatic radiation filed extraction and correlation of portal images"; *Medical Physics*, H. Wang et al., vol. 21, Feb. 1984, No. 2, pp. 237–244.

"In Vivo, Three–Dimensional Microscopy of Trabecular Bone", *Journal of Bone and Mineral Research*, J.H. Kinner et al, vol. 10, No. 2, 1995, pp. 264–270.

*Primary Examiner*—Andrew W. Johns
*Attorney, Agent, or Firm*—Sughrue, Mion, Zinn, Macpeak & Seas, PLLC

[57] ABSTRACT

A binary image of a bone section is provided to be processed. A region of interest is provided on the binary image to produce a ROI image by extracting pixels corresponding to the bone portion from the binary image within the region of interest, onto which ROI image morphometry is carried out. A series of pixels which are on the center line extending along the cortical bone portion in the ROI image. A hemi-cortical bone image is produced by using the determined center line. The hemi-cortical bone image has a wall thickness substantially half of the real wall thickness of the cortical bone portion. A template image for the cortical bone portion is produced by executing expanding operations on the hemi-cortical bone image a predetermined number of times.

22 Claims, 24 Drawing Sheets

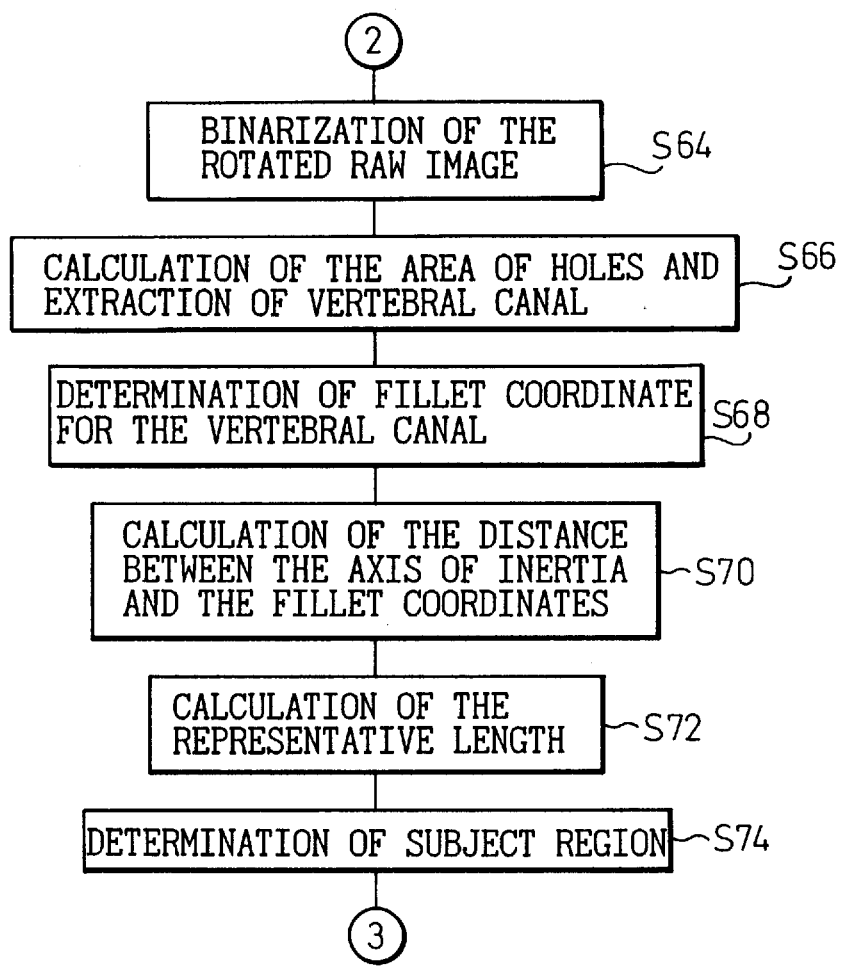

METHOD OF PROCESSING A SECTIONAL IMAGE OF A SAMPLE BONE INCLUDING A CORTICAL BONE PORTION AND A CANCELLOUS BONE PORTION

BACKGROUND OF THE INVENTION

1. Field of the Invention

The invention relates to a bone morphometric method, in particular, to a method of processing a sectional image of a sample bone which includes a cortical bone portion and a cancellous bone portion.

2. Description of the Related Art

The morphologies of human bones are measured to evaluate the strength of bones, to diagnose and determine the degree of progress of bone diseases such as osteoporosis and osteomalacia, or to confirm a therapeutic effect.

As an example of a method for diagnosing the reduction of bone strength due to bone disease, the DEXA (Dual Energy X-ray Absorptiometry) method and the MD (Micro Densitometry) method are known in the art. The DEXA and MD methods measure the amount or the dencity of bone mineral to diagnose the reduction of bone strength based on an assumption that there is a correlation between the amount or the dencity of bone mineral and the bone strength. However, in fact, the amount or the dencity of bone mineral does not precisely present the bone strength since bone structure significantly affects the bone strength. Thus, in the recent years, an attempt has been developed to evaluate the bone strength based on a postulate that bone strength depends significantly on the bone structure as well as bone mineral.

As a bone structural analysis, sectional bone structural analysis is known in the art. In the sectional bone structural analysis, a sectional image of a bone is provided by a micrograph or a X-ray computed tomography of a sample bone, and is used for measuring various parameters, such as, the sectional area and the perimeter, for evaluating structural anisotropy in the bone portion (refer to "Journal of Japanese Society of Bone Morphometry" Vol. 4, No. 1 Pages 83–89, 1994), and for the Node-strut method (refer to "Journal of Microscopy" Vol. 142, Pt3, Pages 341–349, 1986).

FIG. 1 is a schematic illustration of a vertebral body constituting a human spine. In general, a static compressive force substantially acts on end faces of the vertebral body within areas 2 (only one in the top end face is shown in FIG. 1) as shown by arrows 1. Therefore, during a bone morphometry, a subject region for analysis is defined on a sectional image of a sample bone, and within the subject region for analysis, various analyses, such as measurements of total area in the sectional bone image, mean wall thickness of the cortical bone and the cancellous bone portions, are carried out. In particular, the bone portion within the subject region is defined as a region of interest (ROI) so that various structural parameters are measured relative to the ROI.

With reference to FIGS. 2–4, a sectional binary image of a vertebral body of a rat (FIG. 2), a micrograph of a vertebral body of a human (FIG. 3), and a sectional binary image of a femur of a rat (FIG. 4) are shown, respectively. In FIGS. 2 and 3, enclosed by subject regions 3 and 4 for analysis, are the portions on which a static compressive force primarily acts. In FIG. 4, all of the sectional image is enclosed by a rectangle 5 as a subject region for analysis. As shown in FIGS. 2–4, the subject region for analysis are defined by configurations which have various shapes, sizes and orientations, for example, the rectangles 5 and 6, triangles 7 and 8, a sector 3, a circle and a configuration 4 combined thereby.

In the prior art, a subject region for analysis is manually provided on a sectional image of a sample bone so that a human error is introduced into the size, shape, orientation, and position of the subject region. The human errors reduce the credibility and repeatability of the sectional bone structural analysis carried out based on such a manually provided subject region.

On the other hand, the bone structure includes, in general, surface and internal structures. The internal structure further includes cancellous and cortical bone portions which have different functions. For example, when a person falls so that a load is applied to a bone, the cancellous bone portion functions to bear the deformation while the cortical bone portion functions to absorb the impact. Therefore, the cancellous and cortical bone portions must be considered separately to evaluate the internal bone structure. There are, some apparatuses, for evaluating internal bone structure, which can separate the cancellous and cortical bone portions from each other to measure and evaluate the respective portions independently.

Such an apparatuses binarizes a raw sectional bone image, which is produced by a micrograph or X-ray computed tomograph of a sample bone to provide an original binary image for processing to separate the sectional bone image into cancellous and cortical bone portions. Then, a filling hole operation is carried out on the original binary image within the peripheral of the bone sectional image to provide a solid image. The solid image is contracted until its area becomes half. According to this prior art method, a cancellous bone portion is provided by extracting the pixels which are common to the original binary image and the contracted solid image (referred to AND operation between the original binary image and the contracted solid image). A cortical bone portion is provided by extracting the pixels which are not common to the original binary image and the contracted solid image (referred to NAND operation of the original binary image and the contracted solid image).

The above-mentioned prior art method defines the cancellous and cortical bone portions irrespective of the actual thickness of the cortical bone so that the structural evaluation based on the cancellous and cortical bone images thus provided cannot reflect the real bone strength.

SUMMARY OF THE INVENTION

The invention is directed to solve the problems in the prior art, and to provide an improved method of processing a sectional bone image for using in a morphometry of a bone which includes a cortical bone portion and a cancellous bone portion. The invention provides a method of processing a sectional bone image of a sample bone which method can eliminate a human error, as produced in the prior art, by providing a subject region on a binary image digitized from the sectional bone image automatically. Further, the invention provides a fine separation of the cortical bone portion and the cancellous bone portion so that the morphometry of the sample bone, in particular, the cancellous bone portion can be carried out with high precision and repeatability.

According to the invention, first, a binary image of a bone section is provided to be processed. A subject region is provided on the binary image to producing a ROI image by extracting pixels corresponding to the bone portion from the binary image within the subject region, onto which ROI image the morphometry is carried out. A series of pixels which are on the center line extending along the cortical bone portion in the ROI image is determined. A hemi-cortical bone image is produced by using the determined center line. The hemi-cortical bone image has a wall thickness substantially half of the real wall thickness of the cortical bone portion.

A template image for the cortical bone portion is produced by executing expanding operations on the hemi-cortical bone image with a predetermined number of times of operation. The template image for the cortical bone portion, produced by expanding the hemi-cortical bone image by a number of times which is advantageously selected, defines precisely a region within which the cortical bone portion extends since the hemi-cortical bone image has a wall thickness substantially half of the real wall thickness of the cortical bone portion.

The number of times for carrying out the expansion is preferably defined by INT(MWT×α+1). where INT(x): a function removing fractional portion from x α: a predetermined constant value Preferably, α=2.0 is selected. Alternatively, the number of times for carrying out the expansion may be defined by INT(MWT×α+1.5).

According to another feature of the invention, extracting the pixels common to the ROI image and the template image provides an image substantially corresponding to the cortical bone portion, and eliminating the image corresponding to the cortical bone image from the ROI image provides an image corresponding to the cancellous bone portion. It will be understood that eliminating the pixels which are common to the ROI image and the template image from the ROI image can also provide an image corresponding to the cancellous bone portion.

According to another feature of the invention, a tensor analysis of the image corresponding to the cancellous bone determines the structural anisotropy in the cancellous bone.

According to another feature of the invention, when the sectional binary image is of a vertebral body which includes a cortical bone portion and a cancellous bone portion, the region of interest is provided by providing a subject region on the binary image as follows. First, the axis of inertia of the binary image of a vertebral body, and pixels corresponding to the vertebral canal within the binary image of a vertebral body are determined. The smallest rectangle enclosing the pixels of the vertebral canal is provided and a pair of fillet coordinates which are at the corners on one of the diagonals of the smallest rectangle enclosing the vertebral canal are determined. A subject region on the binary image is provided based on a representative length, which is defined by determining the distances between the axis of inertia and the fillet coordinates as the representative length, to extract pixels corresponding to the bone portion within the subject region, whereby the region of interest is defined on the binary image by the extracted pixels.

Then, the hemi-cortical bone image is provided as follows. An operation region to enclose the ROI image is provided so that the operation region including the largest and second largest background portion at either side of the ROI image bounds the center line pixels. The largest and second largest backgrounds within the operation region are determined, preferably, by a labeling operation to label holes which include pixels with zero (0) intensity. Pixels are determined as first pixels which are common with the largest hole image and the ROI image to provide a first hemi-cortical image, and as second pixels which are common with the second largest hole image and the ROI image to provide a second hemi-cortical image. Combining the first and second hemi-cortical images provides the hemi-cortical image.

DESCRIPTION OF THE DRAWINGS

These and other objects and advantages and further description will now be discussed in connection with the drawings in which:

FIG. 9B is a flow chart for a method of providing a subject region for analysis in a sectional image of a vertebral body according to the embodiment of the invention.

DESCRIPTION OF THE PREFERRED EMBODIMENTS

A method of processing a sectional image of a sample bone according to an embodiment of the invention will be described. A sectional image of a sample bone is provided to be input into an image processing system according to the invention. In order to analyze the bone structure with a high precision, an input raw image has a fine resolution, for example, lower than 20 μm per pixel, preferably lower than 10 μm per pixel. In the embodiment of the invention, such a sectional image is obtained by a micro-focus X-ray computed tomography although another method, such as a micrograph of a slice of a sample bone can be utilized.

Figure 1:
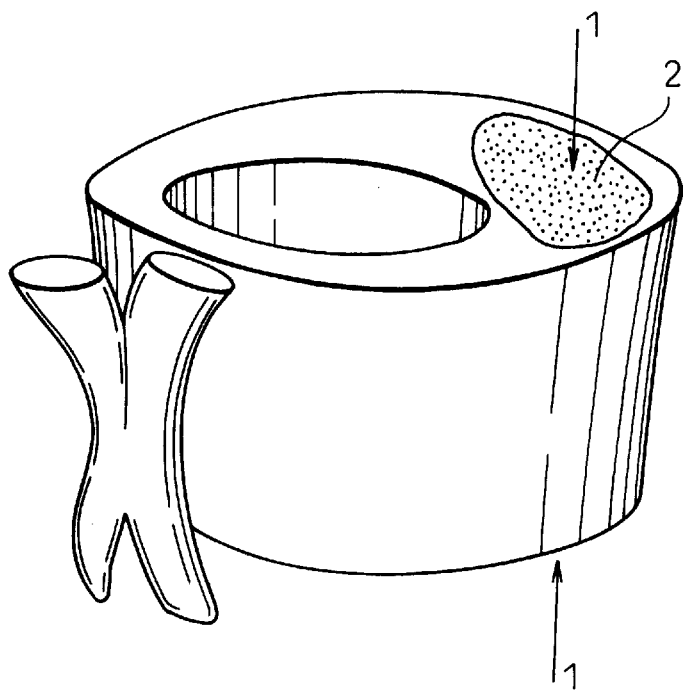
FIG. 1 is a schematic illustration of a vertebral body constituting a human spine.
Figure 2:
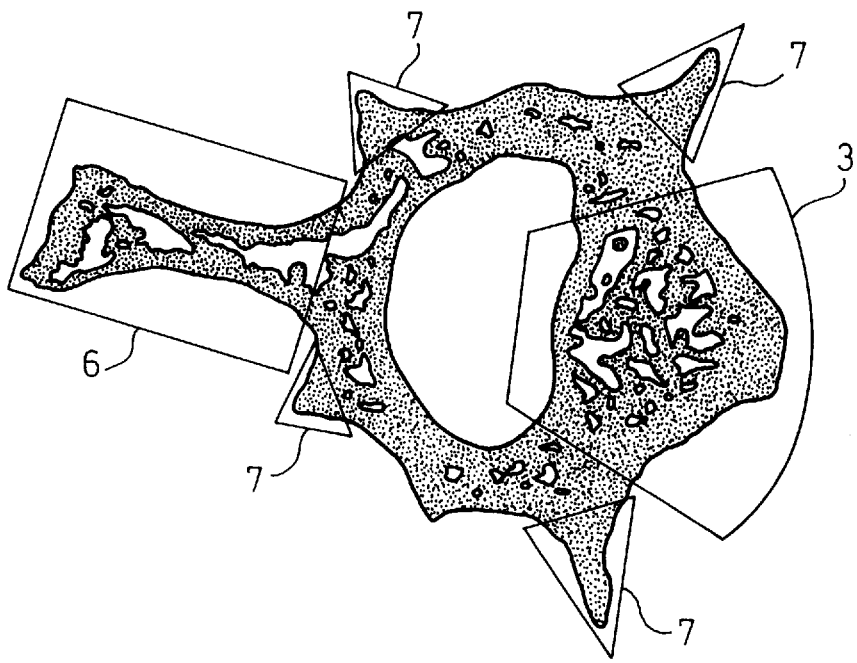
FIG. 2 is a sectional binary image of a vertebral body of a rat.
Figure 3:
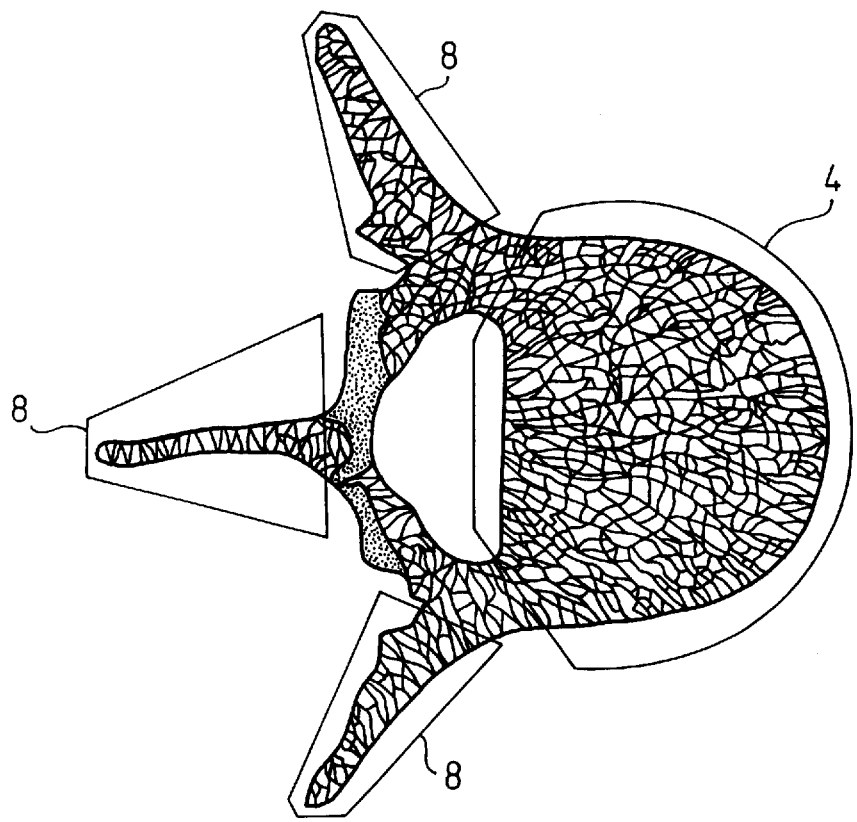
FIG. 3 is a micrograph of a vertebral body of a human.
Figure 4:
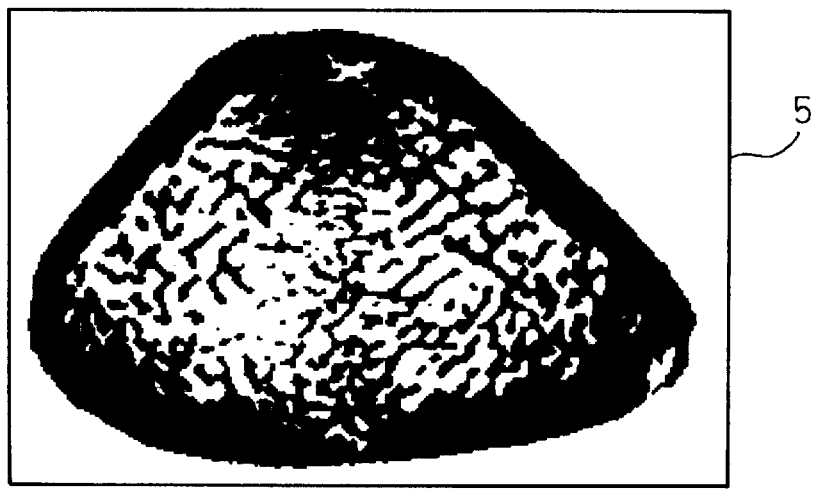
FIG. 4 is a sectional binary image of a femur of a rat.
Figure 5:
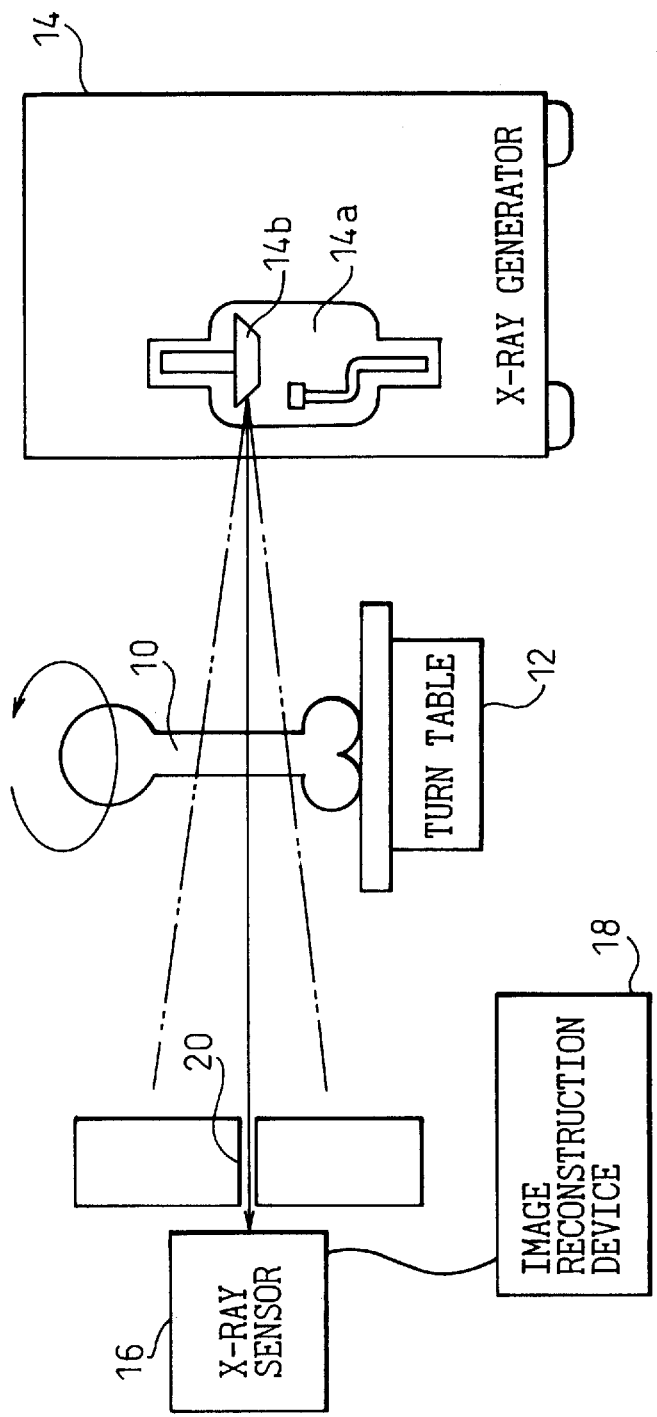
FIG. 5 is a schematic illustration of an apparatus for micro-focus X-ray computed tomography.

With reference to FIG. 5, micro-focus X-ray computed tomography will be described. An X-ray generator 14 includes a X-ray tube 14a of which the size of the focus area is approximately 8 μm and a rotating anode 14b. An X-ray sensor 16 and a slit 20 are provided apart from the X-ray generator 14 so that the slit 20 is positioned between the X-ray generator 14 and the X-ray sensor 16. An image reconstruction device 18 is electrically connected to the X-ray sensor 16 for receiving a signal corresponding to the intensity of the X-ray which reaches to the sensor 16. A sample bone 10 is disposed on a turntable 12 which is provided between the X-ray generator 14 and the slit 20.

X-rays are produced when electron hits the rotating anode 14b, so that the accelerated X-ray is directed to the sample bone 10. The propagated X-ray is attenuated through the sample bone 10 and reach the X-ray sensor 16 through the slit 20 so that X-rays which have the desired slice width are extracted from the propagated X-rays. The X-ray sensor 16 sends a signal to the image reconstruction device 18 corresponding to the intensity of the X-rays. The image reconstruction device 18 stores an information corresponding to the signal. Then, the turntable 12 rotates through a predetermined angle to measure the sample bone 10 at the next rotational angle. The above process is repeated until the measurement is carried out along the full arc of the sample bone 10. Thereafter, the image reconstruction device 18 reconstructs a sectional image of the sample bone 10 based on the memorized information. Changing the level of the turntable 12 provides another sectional image of the sample bone 10 at a different height.

The sectional image thus obtained may consist of 512 pixels×480 pixels with each pixel sized 15 μm×15 μm, and with CT value being expressed by a gradation of $2^{16}$ Further the CT value of the respective pixels is converted into a gradation of $2^8$ by the following equation (1) when the image is input into the image processing system of the invention.

$$TL = INT (0.5 + ((CT \text{ value of the respective pixels}) - \quad (1)$$

$$(CT_{min}))/(CT_{max}) - (CT_{min})) \times 255)$$

where

TL : converted CT value $CT_{max}$ : the maximum CT value (e.g. 2000)

$CT_{min}$ : the minimum CT value (e.g. 500)

INT(x): a function removing fractional portion from x

The image thus obtained is processed by the image processing system of the invention as described below.

Figure 6:
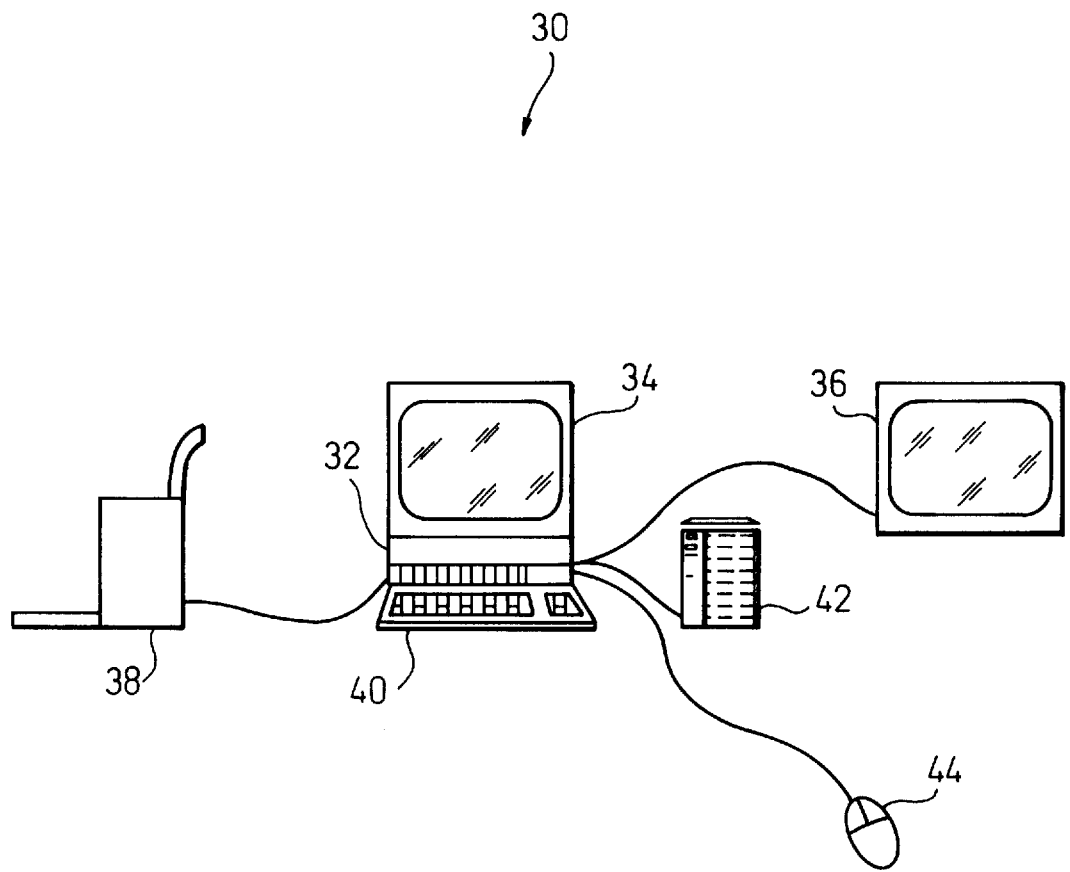
FIG. 6 is a schematic illustration of an example of an image processing system to which the inventive method can be applied.

With reference to FIG. 6, an image processing system according to the embodiment of the invention will be described. In FIG. 6, the image processing system 30 includes a computer 32 provided with a microprocessor (not shown) and memory devices (not shown) as known in the art. The image processing system 30 further includes a first or main display unit 34, such as a CRT display, for indicating text information, a second or additional display unit 36, such as a CRT display, for indicating the processed image, an output unit 38 such as a printer, and a key board 40. The system can include an additional memory device 42 such as an external hard drive unit or an magneto-optical disc drive. Instead of the first and second displays 34 and 36, a display can be provided for indicating the text information and the processed image. The system may further include a pointing device 44, such as a mouse, a track ball, a touch panel or a light pen, for inputting a reference point necessary for the bone morphometry in the displayed image.

Figure 7A:
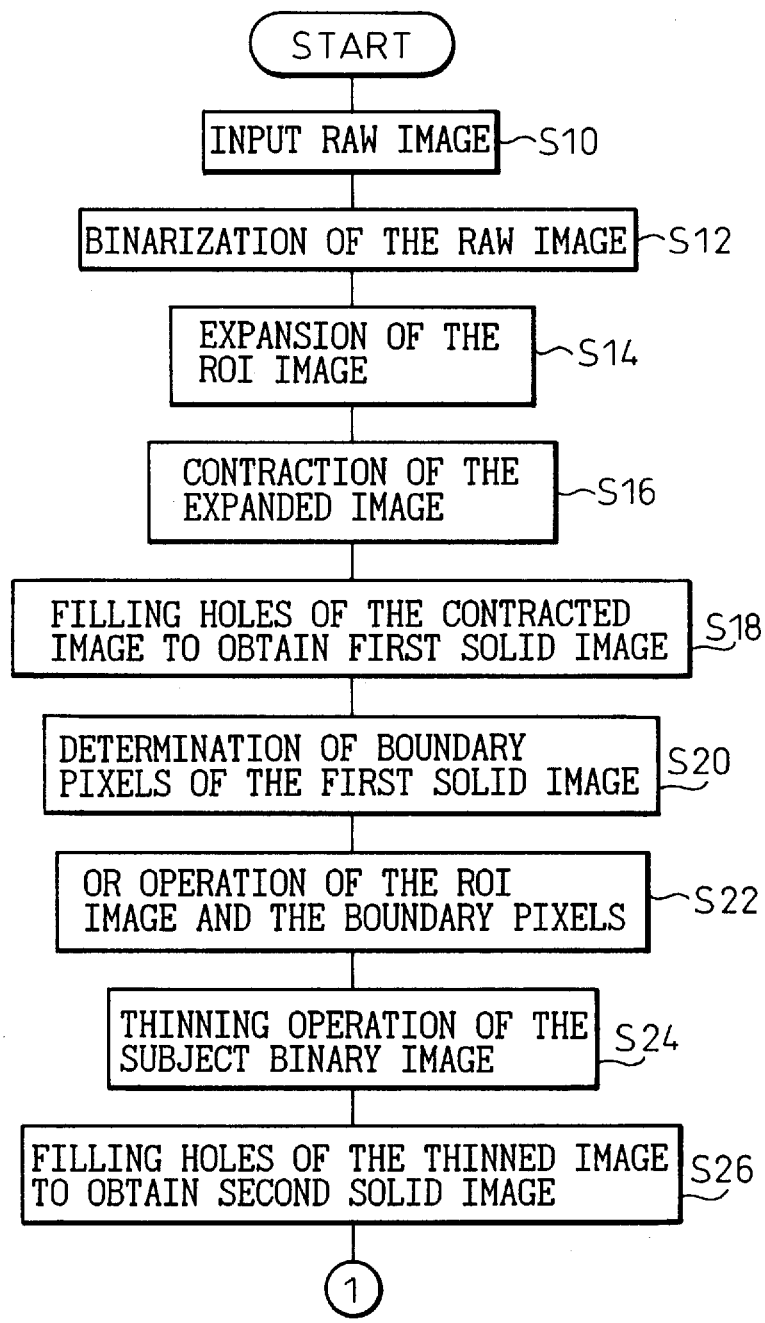
FIG. 7A is a flow chart for a method of providing a subject region for analysis on a sectional binary image of a femur of a rat, and of separating a cortical bone portion and a cancellous bone portion from each other according to the preferred embodiment of the invention.
Figure 7B:
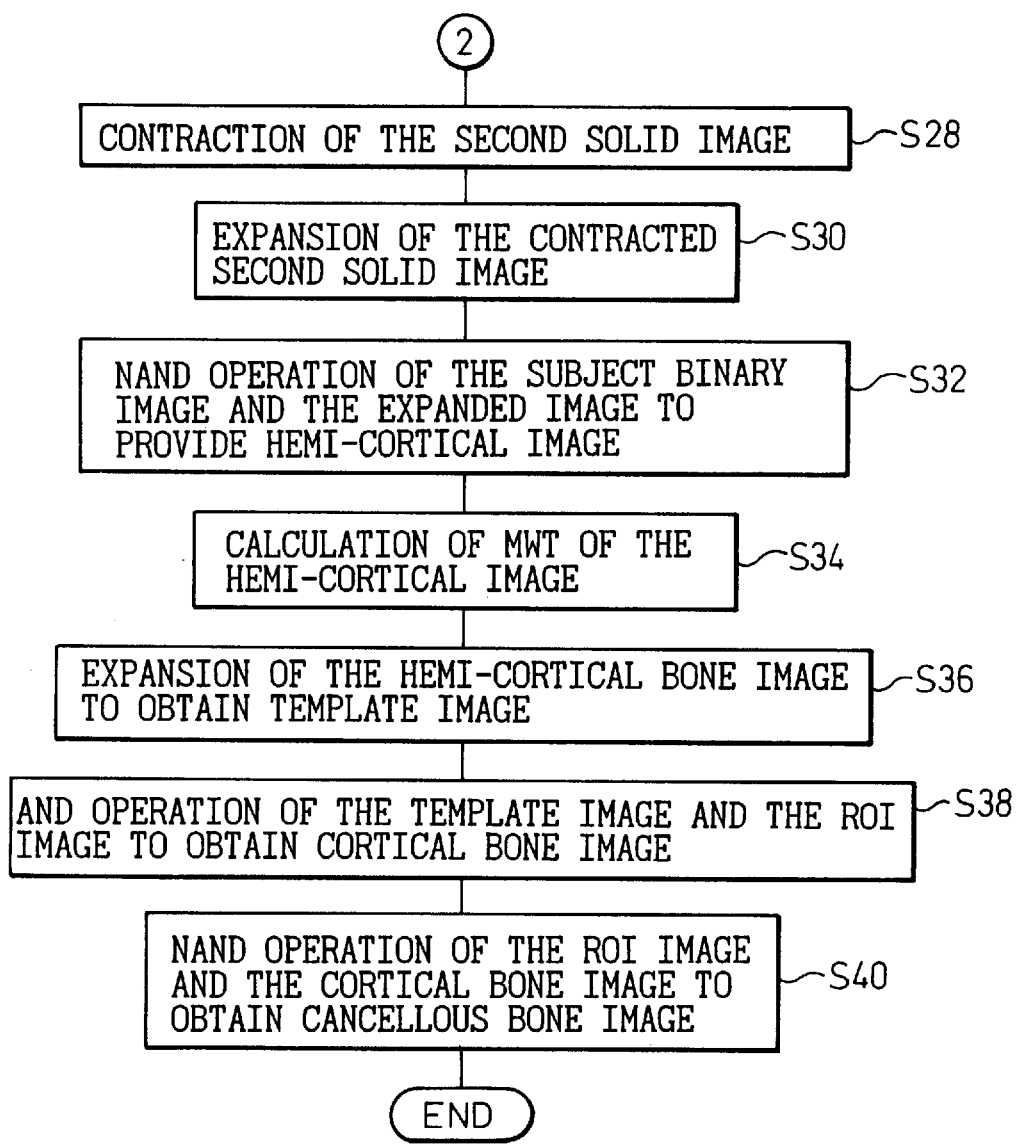
FIG. 7B is a flow chart for a method of providing a subject region for analysis on a sectional binary image of a femur of a rat, and of separating a cortical bone portion and a cancellous bone portion from each other according to the preferred embodiment of the invention.

With reference to FIGS. 7 and 8, a method of providing a subject region for analysis on a sectional binary image of a sample bone, in particular, a femur of a rat, and of separating cortical bone portion and cancellous bone portion from each other according to the preferred embodiment of the invention will be described.

In step S10, a sectional image of a femur of a rat which is obtained by X-ray computed tomography is input into the image processing system as a raw image. In step S12, the input raw image is binarized or digitized to provide a binary image of a bone section. In this embodiment, the discriminant analysis method is used to provide the binary image as describe below.

According to the discriminant analysis method, the pixels in an image are classified into two classes by a threshold value so that degrees of deviation of the intensity of the pixels in the respective class are minimized and the degree of deviation between the two classes is maximized. The degree of deviation in classes is defined by the following equation.

$$\delta w^2 = \omega_0 \sigma_0^2 + \omega_1 \sigma_1^2 \quad (2)$$

where $\omega_0$: number of pixels in class 0

$\sigma_0$: degree of deviation of pixel in class 0

$\omega_1$: number of pixels in class 1

$\sigma_1$: degree of deviation of pixel in class 1

On the other hand, the degree of deviation between the two classes is defined by the following equation.

$$\delta B^2 = \omega_1 \omega_2 \cdot (M_0 - M_1)^2 \quad (3)$$

where $M_0$: mean intensity of pixels in class 0

$M_1$: mean intensity of pixels in class 1

The threshold value is determined to minimize the ratio of ($\delta W^2/\delta B^2$). According to the discriminant analysis method, the pixels are thus classified into two classes, that is one is a class of "1" which means the bone portion, and the other is a class "0" which means the background or a hole.

The sectional image is binarized as described above to provide a binary image. In the case of the sectional image of the femur, a subject region for analysis is provided on the binary image to enclose the whole of the bone portion to be defined as region of interest (ROI). Then, the following process is carried out on the ROI image.

In general, a sectional image of a bone obtained by computed tomography may include openings in the cortical bone portion due to the blood vessels extending into the internal tissue of the bone. A binary image based on such a sectional image also includes openings in the cortical bone portion. Therefore, such a binary image must be processed to close the possible openings in the cortical bone portion.

In step S14, n times of expanding operations are carried out on the ROI image, and in step S16, (n+1) times of contracting operations are carried out on the expanded image. In this embodiment, n=12 is advantageously selected in consideration of the general size of the openings in the bone portion. In step S18, a filling hole operation is carried out on the contracted image to provide a first solid image. In step S20, boundary pixels of the first solid image which bounds the background pixels are determined and extracted from the first solid image. In step S22, the pixels which belongs to the boundary pixels or the ROI image are extracted, which is referred to as an OR operation between the boundary pixels and the ROI image. This results in a subject binary image, in which openings in the cortical bone portion are closed by the boundary pixels.

Figure 8A:
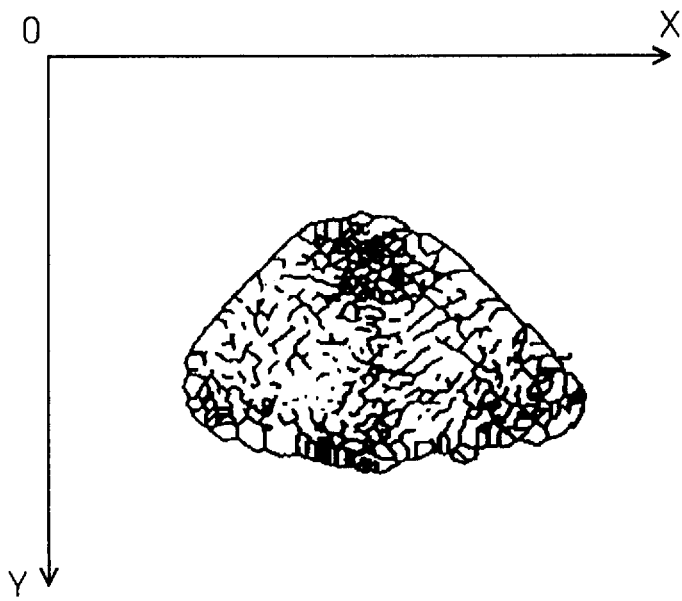
FIG. 8A is a schematic illustration for explaining the method according to the flow chart of FIGS. 7A and 7B, and in particular is a schematic illustration of a thinned image of the sectional binary image of a femur of a rat.
Figure 8B:
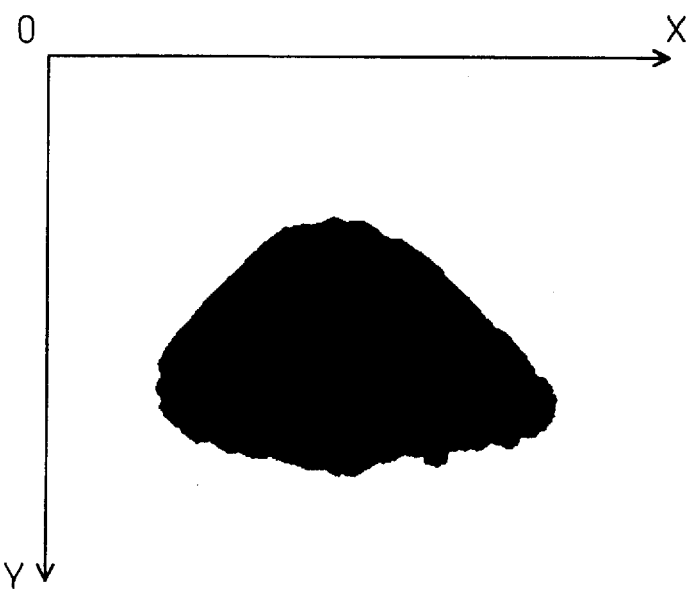
FIG. 8B is a schematic illustration for explaining the method according to the flow chart of FIGS. 7A and 7B, and in particular is a schematic illustration of a solid image produced by filling the holes within the thinned image of FIG. 8A.
Figure 8C:
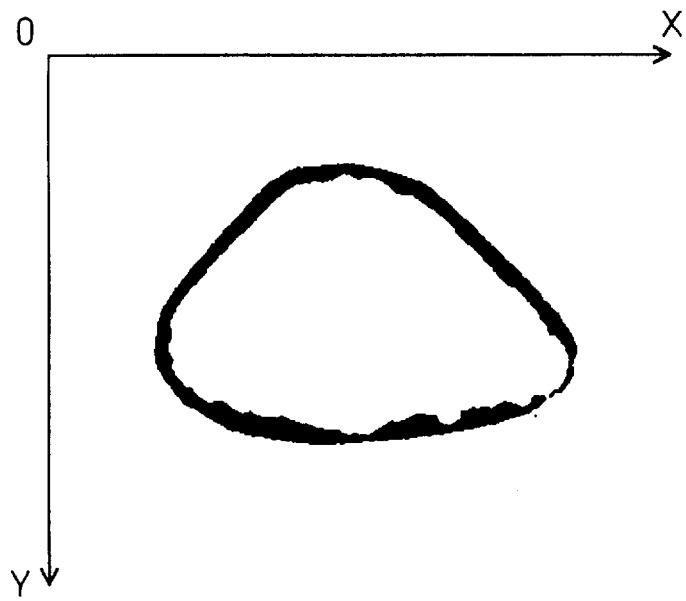
FIG. 8C is a schematic illustration for explaining the method according to the flow chart of FIGS. 7A and 7B, and in particular is a schematic illustration of a hemi-cortical bone image.

In step S24, a thinning operation is carried out on the subject binary image to obtain a thinned image as shown in FIG. 8A. The thinned image includes a series of pixels which are substantially along the center line of the cortical bone portion. In step S26, a filling hole operation is carried out on the thinned image to obtain a second solid image. In step S28, one contracting operation is carried out on the second solid image, and in step S30, one expanding operation is carried out on the contracted second solid image to eliminate noise pixels from the second solid image, which is referred to as a subject solid image.

In step 32, a NAND operation is carried out to extract pixels which are not common to the subject solid image and the subject binary image so that an image (in FIG. 8C) which has a wall thickness substantially half of the real cortical bone portion is provided by the extracted common pixels. The image composed of the extracted pixels is referred to a hemi-cortical bone image in this specification.

Figure 8D:
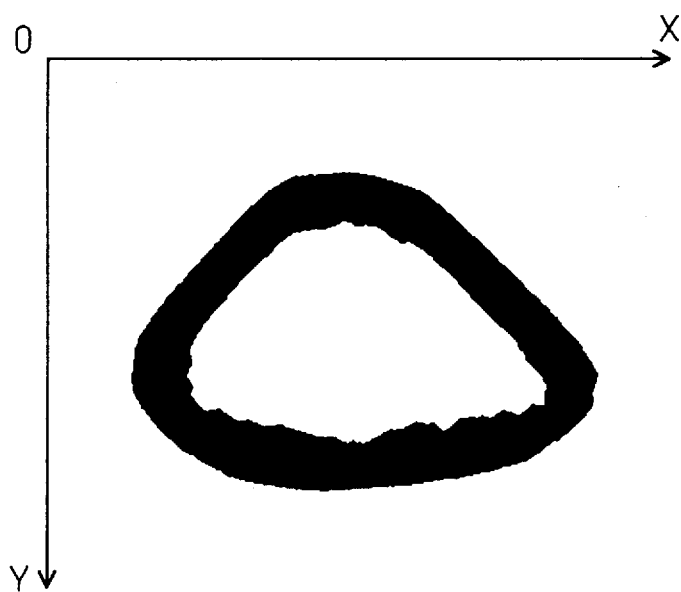
FIG. 8D is a schematic illustration for explaining the method according to the flow chart of FIGS. 7A and 7B, and in particular is a schematic illustration of a template image for the cortical bone portion.
Figure 8E:
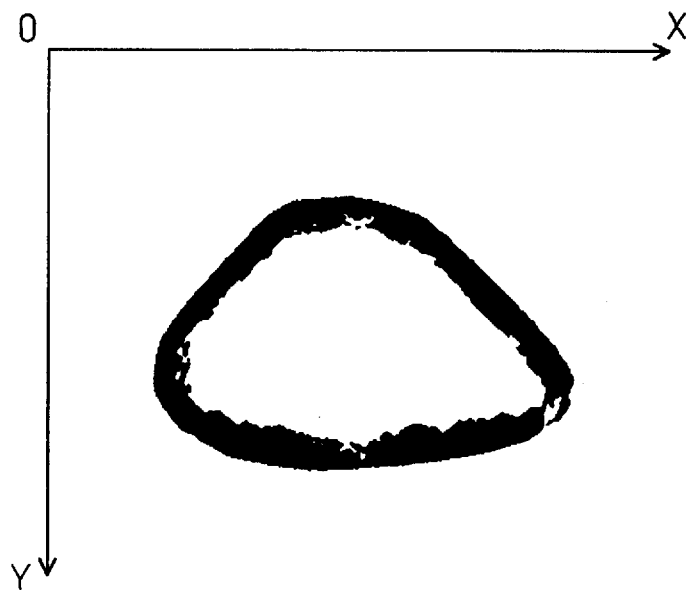
FIG. 8E is a schematic illustration for explaining the method according to the flow chart of FIGS. 7A and 7B, and in particular is a schematic illustration of an image corresponding to the cortical bone portion.
Figure 8F:
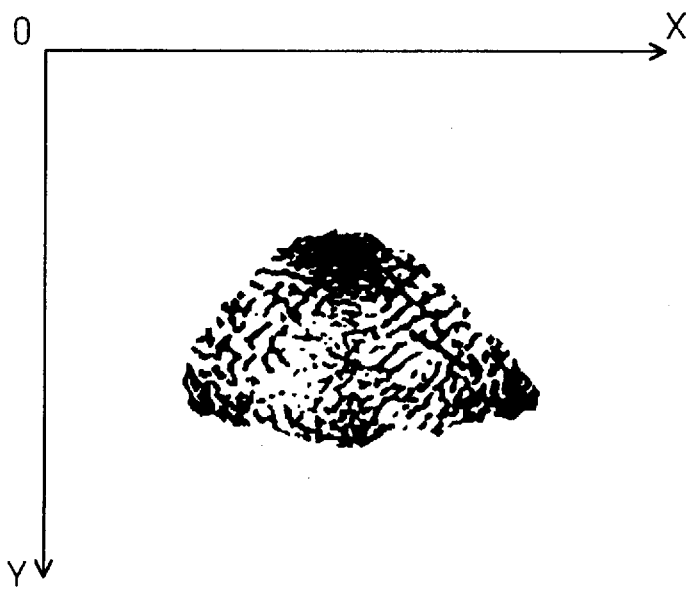
FIG. 8F is a schematic illustration for explaining the method according to the flow chart of FIGS. 7A and 7B, and in particular is a schematic illustration of an image corresponding to the cancellous bone portion.

Based on the hemi-cortical bone image, in step S34, the mean wall thickness (MWT) is calculated by the following equation.

$$MWT = 2.0 \times A_{HI}/P_{HI} \quad (4)$$

where $A_{HI}$: area of the hemi-cortical image $P_{HI}$: perimeter of the hemi-cortical image In step S36, expanding operations are carried out by a predetermined number of times on the hemi-cortical image to provide a template image for the cortical bone portion as shown in FIG. 8D. Experiments show that the number of times for carrying out the expansion is preferably defined by INT(MWT×α+1).

where

INT(x): a function removing fractional portion from x

α: a predetermined constant value

Preferably, α=2.0 is selected. Alternatively, the number of times for carrying out the expansion may be defined by INT(MWT×α+1.5). The cortical bone includes recesses and protrusions along its peripheral surface. When the wall thickness varies significantly along its periphery, or even a small hole presents in the cortical bone, if α=1.0, then the innermost portion of the cortical bone is often recognized as a part of the cancellous bone. Thus, a is empirically selected to a value slightly larger than 1.0, for example α=2.0. When the cortical bone is relatively plain, a number 1.0<α<2.0 can be selected advantageously.

In step S38, an AND operation is carried out between the ROI image and the template image for the cortical bone portion to separate or to extract an image of the cortical bone portion (FIG. 8E) from the ROI image. In step S40, a NAND operation is carried out between the ROI image and the separated cortical bone image to separate or to extract an image of the cancellous bone.

A NAND operation can be carried out between the template image for the cortical bone and the ROI image to provide the cancellous bone image. Removing the cancellous bone image from the ROI image provides the cortical bone image.

A semi-binary image can be provided by putting the intensity values of the original bone sectional image obtained by the micro-focus X-ray computed tomography on the respective pixels of the cortical bone image and/or the cancellous bone image, and putting zero (0) value on the remaining background pixels.

When the section of a sample bone has a relatively simple configuration as in the previous description regarding a femur, the hole of the sectional image can be defined as ROI image. On the other hand, if the section of a sample bone has a relatively complex configuration, for example in case of a vertebral body, a portion of the sectional image must be defined as ROI image onto which an analysis is carried out. According to the invention, ROI is defined through providing a subject region for analysis on the sectional image.

Figure 9A:
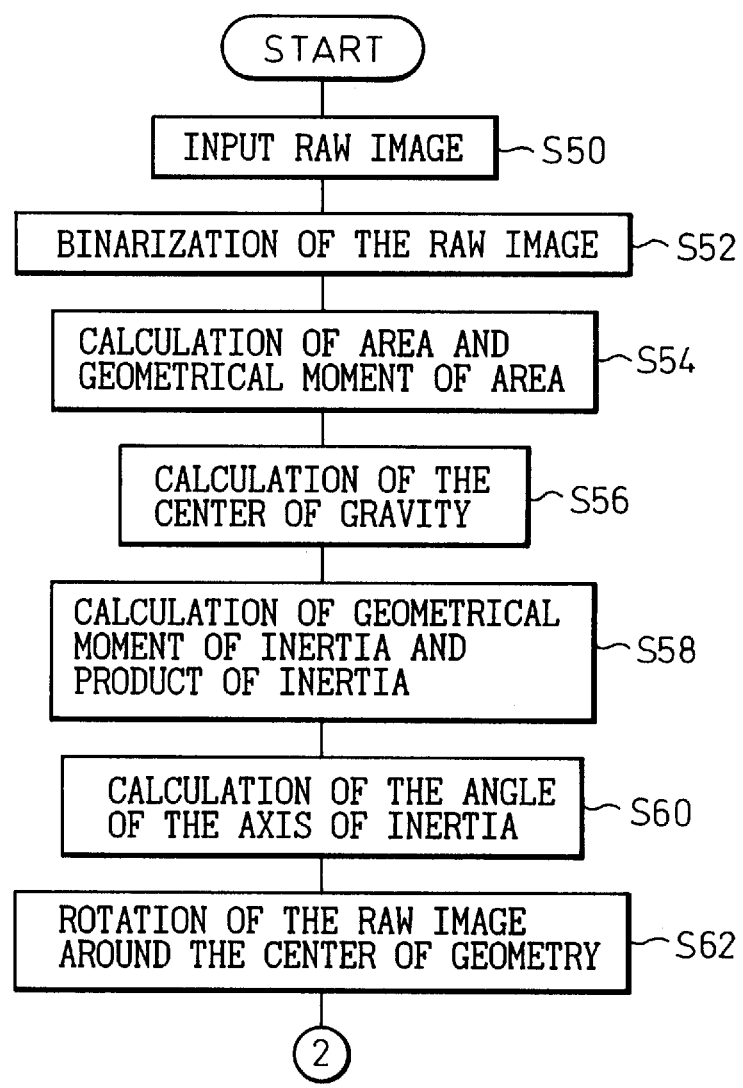
FIG. 9A is a flow chart for a method of providing a subject region for analysis in a sectional image of a vertebral body according to the embodiment of the invention.
Figure 9C:
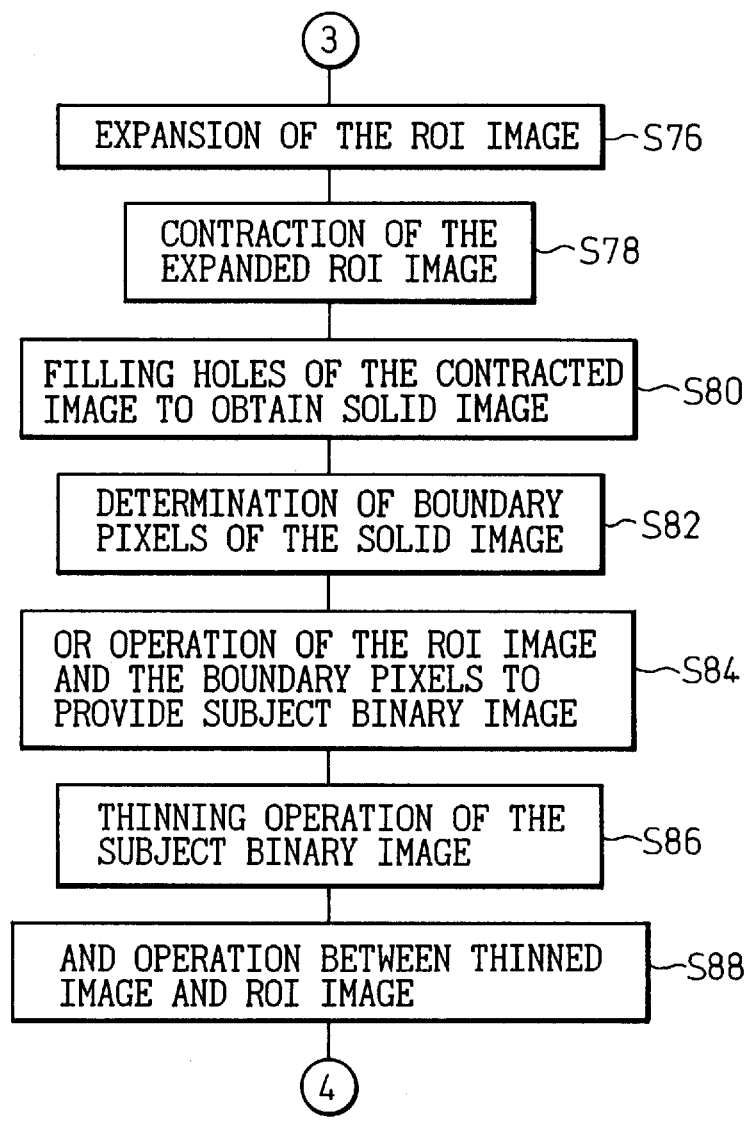
FIG. 9C is a flow chart for a method of providing a subject region for analysis in a sectional image of a vertebral body according to the embodiment of the invention.
Figure 9D:
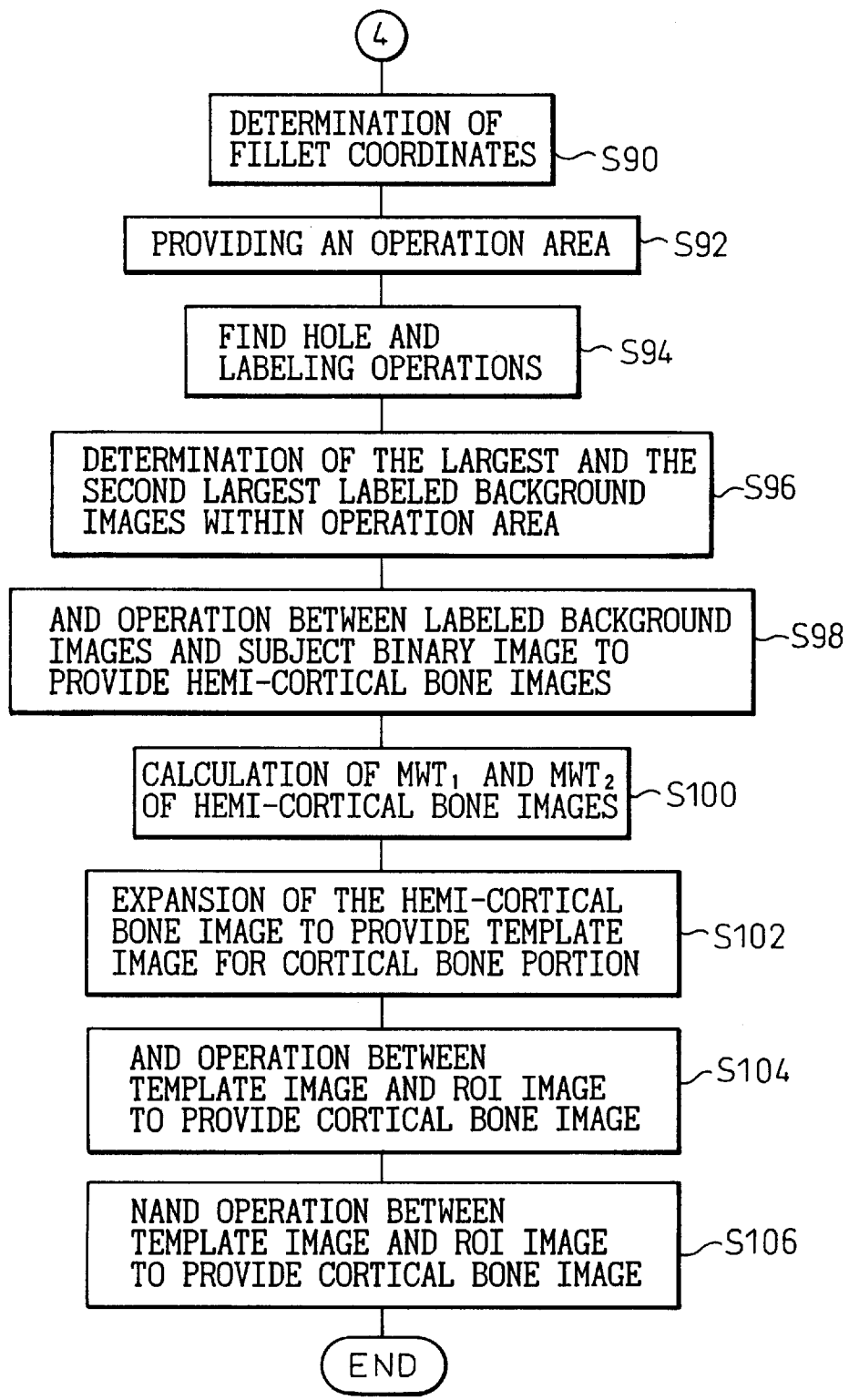
FIG. 9D is a flow chart for a method of providing a subject region for analysis in a sectional image of a vertebral body according to the embodiment of the invention.
Figure 10:
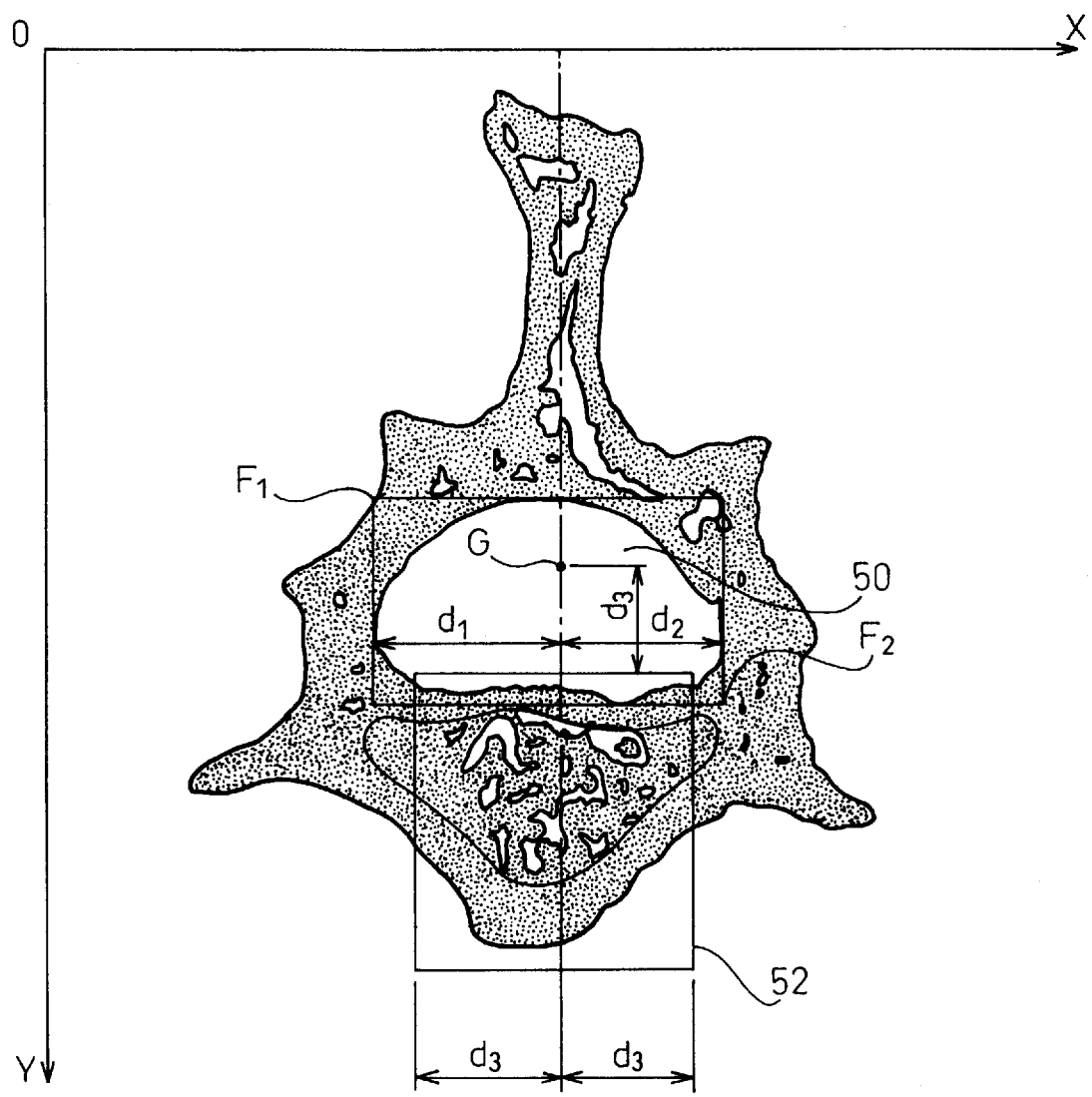
FIG. 10 is a schematic illustration for explaining the method according to the flow chart of FIGS. 9A–9D, and in particular is a schematic illustration of the coordinates and a sectional binary image of a vertebral body.

With reference to FIGS. 9–10, a method of providing a subject region for analysis in a sectional image of a sample bone, in particular, a vertebral body, according to the embodiment of the invention will be described.

In step S50 (FIG. 9A), a bone sectional image is input in the image processing system as a raw image. In this embodiment, a sectional image of a vertebral body of a rat which is obtained by micro-focus X-ray computed tomography is used. In step S52, the input raw image is binarized or digitized to provide a binary image of a bone section as described above.

In step S54, the area of the binary image (AMB) is calculated by the following equation.

$$AMB = \Sigma_i \Sigma_j \phi [p(i,j)] \tag{5}$$

where i: X-axis coordinate (in this embodiment $0 \leq i \leq 511$)

j: Y-axis coordinate (in this embodiment $0 \leq j \leq 479$)

$\phi [p(i,j)]=1$ (if pixel (i,j) belongs to class 1)

$\phi [p(i,j)]=0$ (if pixel (i,j) belongs to class 0)

Further in step S54, the geometrical moment of area is calculated by the following equations.

$$M_{x1} = \Sigma_i \Sigma_j \, j \cdot \phi [p(i,j)] \tag{6}$$

$$M_{y1} = \Sigma_i \Sigma_j \, i \cdot \phi [p(i,j)] \tag{7}$$

where $M_{x1}$: the geometrical moment of area about X-axis $M_{y1}$: the geometrical moment of area about y-axis In step S56, the center of gravity G of the binary image is calculated by the following equation.

$$(X_g, Y_g) = (M_{x1}/AMB, M_{y1}/AMB) \tag{8}$$

where $(X_g, Y_g)$: coordinate of the center of gravity

In step S58, the geometrical moment of inertia of the binary image is calculated by the following equations.

$$M_{x2} = \Sigma_i \Sigma_j \, (j-Y_g)^2 \cdot \phi [p(i,j)] \tag{9}$$

$$M_{y2} = \Sigma_i \Sigma_j \, (i-X_g)^2 \cdot \phi [p(i,j)] \tag{10}$$

where $M_{x2}$: the geometrical moment of inertia about X-axis $M_{y2}$: the geometrical moment of inertia about y-axis Further in step S58, the product of inertia is calculated by the following equation.

$$M_{11} = \Sigma_i \Sigma_j \, (i-X_g) \cdot (j-Y_g) \cdot \phi [p(i,j)] \tag{11}$$

where $M_{11}$: product of inertia

In step S60, calculated by the following equation is the angle θ, related to the X-axis, of the axis of inertia about the center of gravity of the bone portion.

$$\theta = (\tan^{-1}(2 \times M_{11}/(M_{x2}-M_{y2})))/2 \tag{12}$$

In step S62, the input raw image is rotated around the center of gravity by (90–θ) degrees in the clockwise direction so that the axis of inertia is parallel to Y-axis. In step S64, the rotated raw image is binarized or digitized by the process described above.

In step S66, pixels corresponding to the vertebral canal in the rotated binary image is determined as described below. With reference to FIG. 10, the rotated binary image of a vertebral body of a rat processed as described above is shown. As can be seen from FIG. 10, the vertebral canal 50 is the largest hole in the sectional bone image. Thus, the areas of the respective holes are calculated by the following equation.

$$A_h = \Sigma_i \Sigma_j \phi_h [p(i,j)] \tag{13}$$

$\phi_h [p(i,j)]=1$ (if pixel (i,j) belongs to class 0 which indicates a hole)

$\phi_h [p(i,j)]=0$ (if pixel (i,j) belongs to class 1 which does not indicate a hole)

Then the minimum rectangle, which encloses the vertebral canal and has two pairs of sides parallel to X- and Y-axes, respectively, is provided on the binary image. In step S68, determined is a pair of fillet coordinates $F_1 (x_1, y_1)$ and $F_2 (x_2, y_2)$ which are at the corners on one of the diagonals of the smallest rectangle enclosing the vertebral canal.

Alternatively, the fillet coordinates $F_1$ and $F_2$ can be defined as follows.

$F_1 (x_{min}, y_{min}), F_2 (x_{max}, y_{max})$ or $F_1 (x_{min}, y_{max}), F_2 (x_{max}, y_{min})$ where $x_{max}$: the maximum x coordinate of the pixel which belongs to the vertebral canal $y_{max}$: the maximum y coordinate of the pixel which belongs to the vertebral canal $x_{min}$: the minimum x coordinate of the pixel which belongs to the vertebral canal $y_{min}$: the minimum y coordinate of the pixel which belongs to the vertebral canal In step S70, distances $d_1$ and $d_2$ are calculated between the axis of inertia and the fillet coordinates $F_1 (x_1, y_1)$ and $F_2 (x_2, Y_2)$, respectively. In step 72, a representative length $d_3$ is calculated by the following equation.

$$d_3 = INT(\beta \times Min(d_1, d_2) + 0.5) \tag{14}$$

where if $d_1 > d_2$, then $Min(d_1, d_2) = d_2$ \hfill (15)

if $d_1 < d_2$, then $Min(d_1, d_2) = d_1$ \hfill (16)

INT(x): a function removing fractional portion from x

β: a constant value

The constant value β can be optionally determined to eliminate unwanted bone portions, such as anapophysises, which do not substantially contribute to the bone strength. In this embodiment, β=0.9 is selected in consideration of the general configuration of a vertebral body of a rat. Another value of β can be advantageously employed depending on the general configuration in a sectional image of a kind of a bone.

Figure 11:
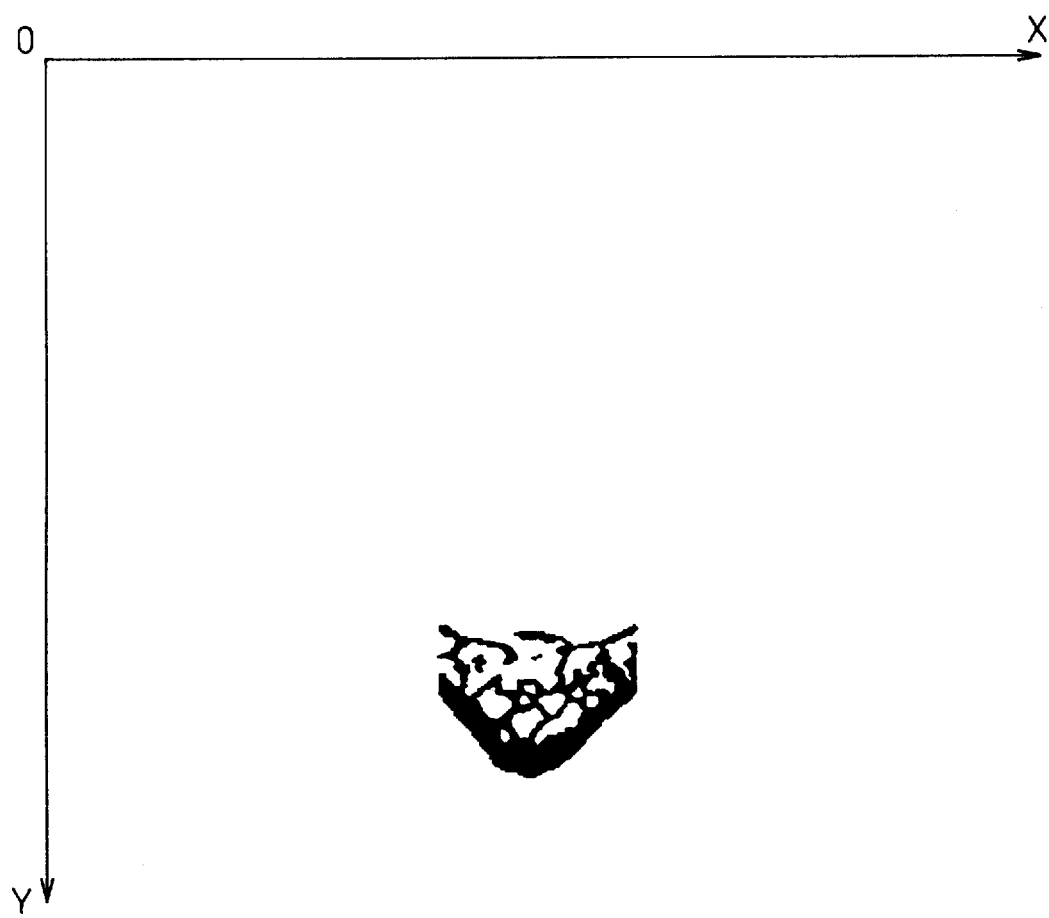
FIG. 11 is a schematic illustration for explaining the method according to the flow chart of FIGS. 9A–9D, and in particular is a schematic illustration of the ROI image extracted from the sectional binary image of FIG. 10.

In step S74, a subject region for analysis is defined automatically by using the representative length $L_r$ so that the previously mentioned prior art human error is eliminated. In this embodiment, a subject region for analysis is defined by a rectangle 52 which has a pair of diagonal coordinates $(X_g-d_3, Y_g)$ and $(X_g+d_3, 479)$. A ROI is defined within the subject region to provide a ROI image by the pixels corresponding to the bone portion within the subject region as shown in FIG. 11.

In step S76, n times of expanding operations are carried out on the ROI image, then in step S78, (n+1) times of contracting operations are carried out on the expanded image. In this embodiment, n=8 is advantageously selected in consideration with the general size of the openings in the bone portion. In step S80, a filling hole operation is carried out on the contracted image to provide a solid image.

In step S82, boundary pixels of the solid image which contact the background pixels are determined, and are extracted from the solid image. In step S84, an OR operation between the boundary pixels and the ROI image are executed to provide a subject binary image, in which openings in the cortical bone portion are closed by the boundary pixels.

Figure 12A:
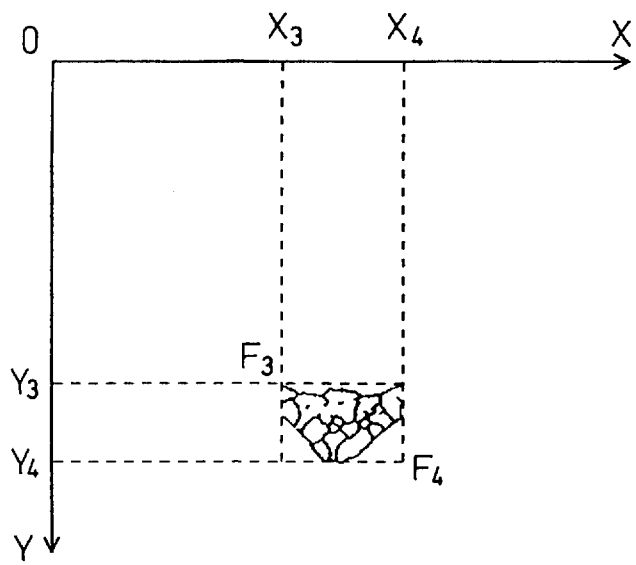
FIG. 12A is a schematic illustration for explaining the method according to the flow chart of FIGS. 9A–9D, and in particular is a schematic illustration of the thinned image.

In step S86, a thinning operation is carried out on the subject binary image to obtain a thinned image. The thinned image includes a series of pixels which are substantially along the center line of the cortical bone portion. In step S88, an AND operation is carried out between the thinned image and the ROI image to provide a thinned subject image shown in FIG. 12A. In step S90, a pair of fillet coordinates $F_3$ ($x_3$, $y_3$) and $F_4$ ($x_4$, $y_4$), which are at the corners on one of the diagonals of the smallest rectangle enclosing the thinned subject image, are determined. Alternatively, the fillet coordinates F3(x3, y3) and F4(x4, y4) can be defined as follows.

Figure 12B:
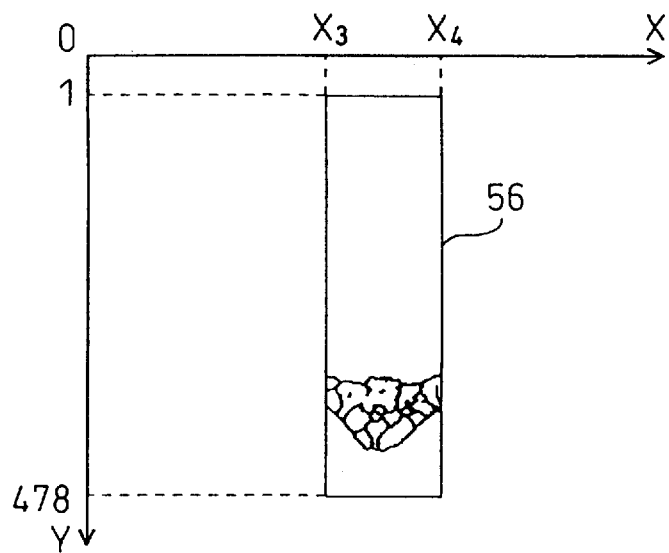
FIG. 12B is a schematic illustration for explaining the method according to the flow chart of FIGS. 9A–9D, and in particular is a schematic illustration of providing an operation area on the thinned image of FIG. 12A.

$F3(x_{min}', y_{min}')$, $F4(x_{max}', y_{max}')$ or
$F3(x_{min}', y_{max}')$ , $F4(x_{max}', y_{min}')$
where $x_{max}'$: the maximum x coordinate of the pixel which belongs to the thinned subject image $y_{max}'$: the maximum y coordinate of the pixel which belongs to the thinned subject image $x_{min}'$: the minimum x coordinate of the pixel which belongs to the thinned subject image $y_{min}'$: the minimum y coordinate of the pixel which belongs to the thinned subject image In step S92, a rectangle operation area 56 which has a pair of fillet coordinates $F_{oa1}$ ($x_3$, 1), $F_{oa2}$ ($x_4$, 478) is provided as shown in FIG. 12B. The rectangle operation area 56 includes the largest and second largest holes or backgrounds 58 and 60 which have the background intensity, 0 (zero), in this embodiment at the upper and lower sides which bounds the pixels of the thinned subject image corresponding to the center line extending along the cortical bone portion.

Figure 12C:
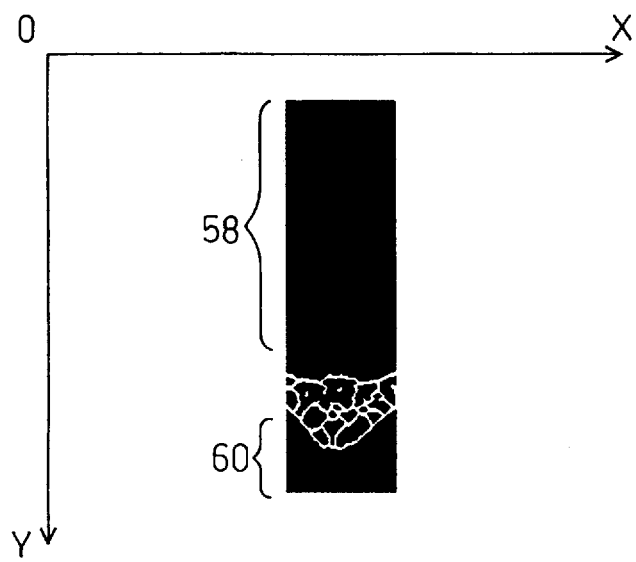
FIG. 12C is a schematic illustration for explaining the method according to the flow chart of FIGS. 9A–9D, and in particular is a schematic illustration for explaining the find hole process executed within the operation area of FIG. 12B.

In step S94, a find hole operation, which determines holes which have the background intensity is carried out within the operation area 56, and the respective holes are labeled. In step S96, the largest and the second largest backgrounds 58 and 60, which are labeled in step S94, are determined in the operation area 56 as shown in FIG. 12C.

Figure 12D:
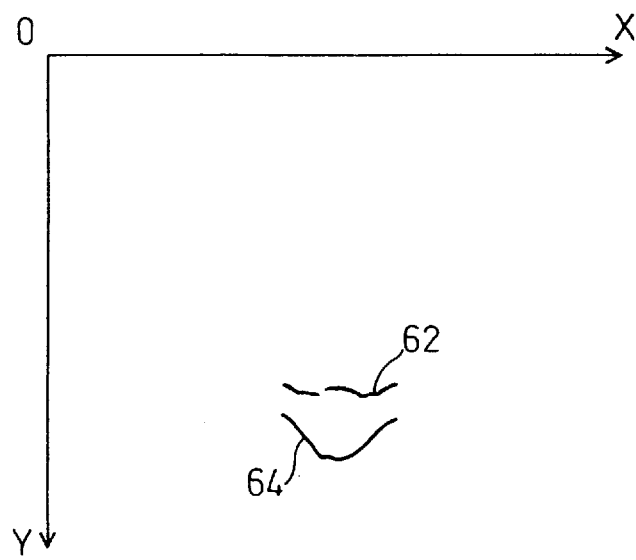
FIG. 12D is a schematic illustration for explaining the method according to the flow chart of FIGS. 9A–9D, and in particular is a schematic illustration of the hemi-cortical bone image.

In step S98, the pixels which are common to the largest background image and the subject binary image (AND operation) to provide a first hemi-cortical image 62 shown in FIG. 12D, which has a wall thickness substantially half of the corresponding portion of the real cortical bone. Similarly, an AND operation is carried out between the second largest background image and the subject binary image to provide a second hemi-cortical image 64. In step S100, the mean wall thickness ($MWT_1$ and $MWT_2$) of the first and second hemi-cortical images 62 and 64 is calculated, respectively as described above. FIG. 12D shows a hemi-cortical bone image combined by the first and second hemi-cortical bone images 62 and 64.

Figure 12E:
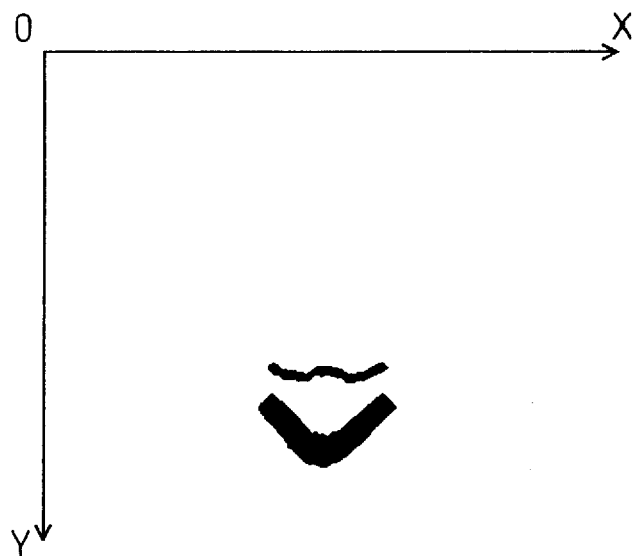
FIG. 12E is a schematic illustration for explaining the method according to the flow chart of FIGS. 9A–9D, and in particular is a schematic illustration of the template image for the cortical bone portion.

In step S102, expanding operations are carried out on the hemi-cortical image to provide a template image for the cortical bone portion as shown in FIG. 12E. In particular, the first hemi-cortical bone image 62 is expanded $n_1$ times, and the second hemi-cortical bone image 64 is expanded $n_2$ times. The numbers $n_1$ and $n_2$ are preferably defined as follows.

$n_1 = INT(MWT_1 \times \alpha_1 + 1)$ $n_2 = INT(MWT_2 \times \alpha_2 + 1)$

INT(x): a function removing fractional portion from x $\alpha_1$ : a predetermined constant value $\alpha_2$ : a predetermined constant value Preferably, $\alpha_1$=2.0 and $\alpha_2$=2.0 can be selected. Alternatively, $n_1$=INT($MWT_1 \times \alpha_1$+1.5) and $n_2$=INT($MWT_2 \times \alpha_2$+1.5) may be used.

Figure 12F:
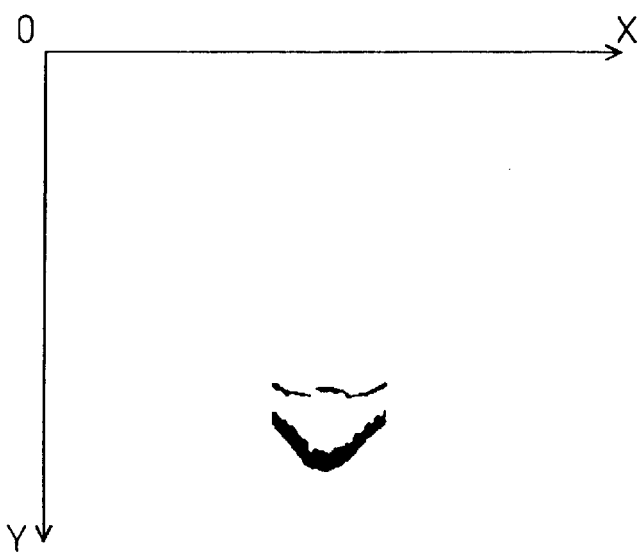
FIG. 12F is a schematic illustration for explaining the method according to the flow chart of FIGS. 9A–9D, and in particular is a schematic illustration of an image corresponding to the cortical bone portion.
Figure 12G:
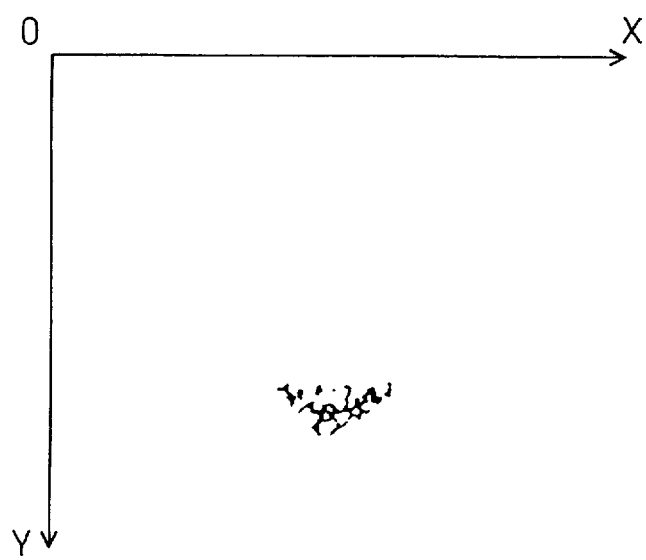
FIG. 12G is a schematic illustration for explaining the method according to the flow chart of FIGS. 9A–9D, and in particular is a schematic illustration of an image corresponding to the cancellous bone portion.

In step S104, an AND operation is carried out between the template image and the ROI image to extract pixels corresponding to the cortical bone portion shown in FIG. 12F. In step S106, a NAND operation is carried out between the template image and the ROI image to extract pixels corresponding to the cancellous bone portion shown in FIG. 12G.

Figure 13:
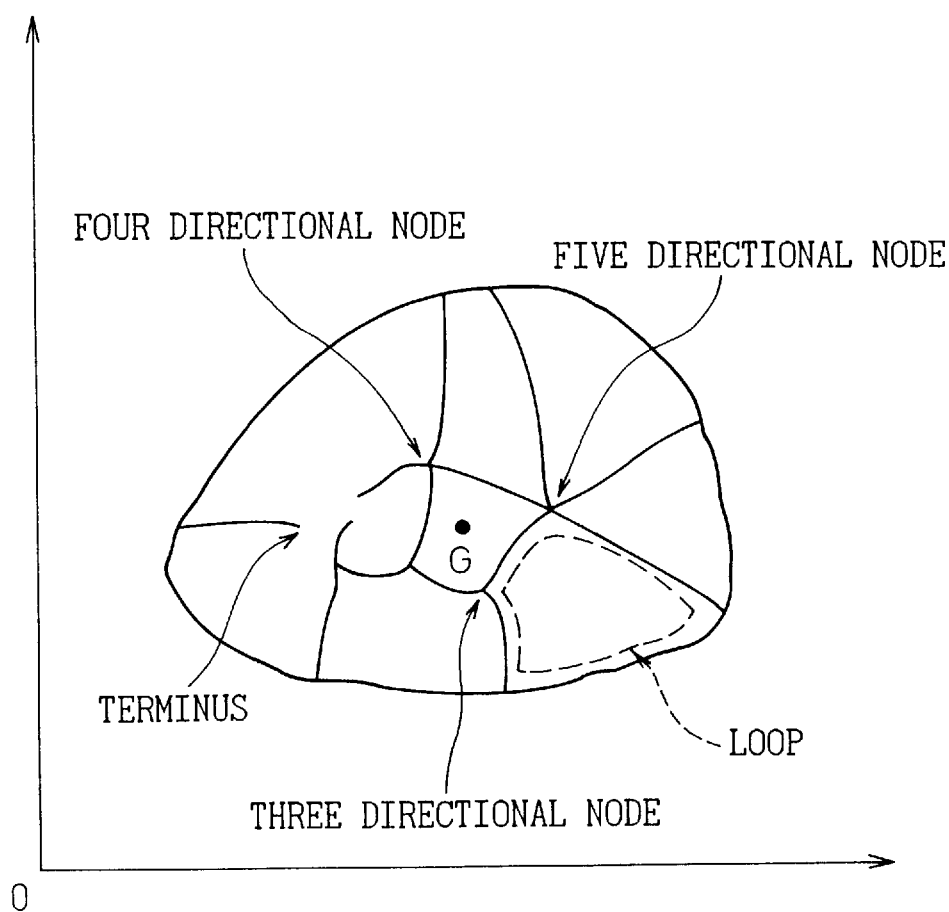
FIG. 13 is a schematic illustration for explaining a various measurements and analyses which can be carried on the thinned image obtained by thinning operation executed on the ROI image provide by the invention, and in particular, measurement of numbers of the nodes, the struts and the terminuses, and measurement of the length of the struts of the bone portion are illustrated.

It can be seen that, according to the invention, the cancellous bone portion and the cortical bone portion are extracted from the binary image of a sample bone section through providing the hemi-cortical bone image and the template image for the cortical bone portion. This provides significant improvement in precision of the separation of the cortical bone portion and the cancellous bone portion compared with the prior art. Various measurements and analyses are carried out on the ROI image thus provided. For example, measurement of numbers of the terminuses, the struts and the nodes, and measurement of the length of the struts of the bone portion (shown by fine lines in FIG. 13) can be carried out after the ROI image is further processed by a thinning operation.

Figure 14:
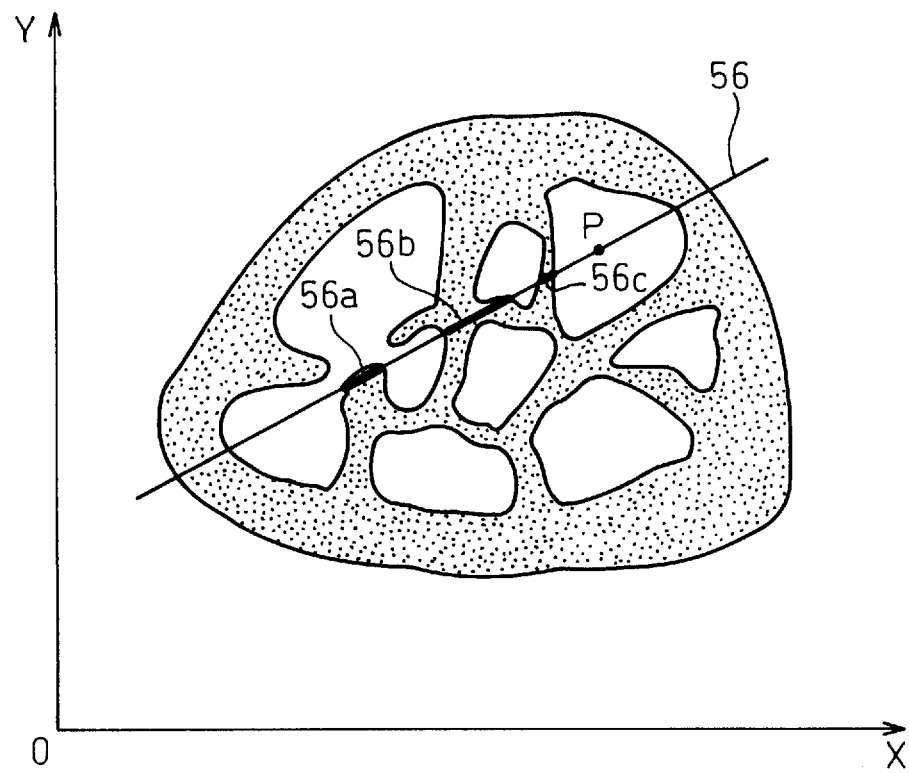
FIG. 14 is a schematic illustration of a measurement of the length of an intercept between a line and the bone portion which can be carried on the ROI image provide by the invention.

FIG. 14 schematically illustrates a measurement of the length of an intercept between a line and the bone portion. In FIG. 14, a line 56, which extends at an angle relative to the X-axis through point P which is selected at random, intersects the cancellous bone portion at three intercepts 56a, 56b and 56c. The respective lengths of the intercepts 56a, 56b and 56c are determined. This process is repeated by a statistically sufficient number of times with the position of the point P and the angle of the line 56 being changed at random. For example, the position of the point P is changed by one hundred times and the angle of the line 56 is changed by thirty-six times at the respective positions of the point P. This measurement can be applied to the cortical bone portion and to the marrow space portion.

Then, the sample of the length of the intercepts measured as described above may be processed to provide mean, maximum and minimum length, standard deviation of length and/or a parameter provided by combination thereof. The sample may be analyzed by using a pattern analysis such as Fourier analysis.

Further, the measurement and analysis can include a tensor analysis of the cancellous bone portion as described hereinafter. According to the embodiment of the invention, the tensor analysis is weighted by the mean wall thickness (MWT) of the cancellous bone portion.

First, MWT of the cancellous bone portion is calculated by means of the total area (Tb.BV) and the total perimeter (Tb.S) of the cancellous bone portion through the following equation.

$$MWT = 2.0 \times (Tb.BV)/(Tb.S) \tag{17}$$

Figure 15:
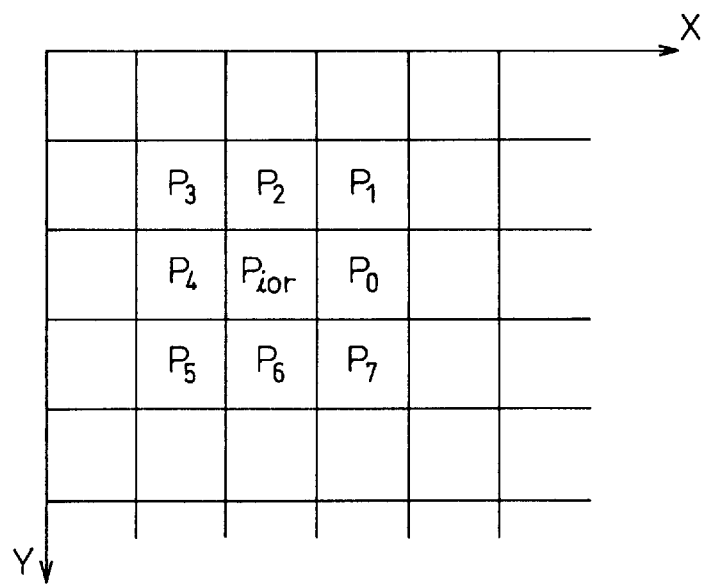
FIG. 15 is a schematic illustration for explaining a method of tensor analysis which is carried out to determine the structural anisotropy of the cancellous bone portion, and in particular, a schematic enlarged illustration of a thinned image produced by a thinning operation executed on the binary image corresponding to the cancellous bone portion provided by the invention, in which a pixel of interest is indicated by "$P_{ior}$", and the adjacent pixels surrounding the pixel of interest Pior are referred to $P_i$, i=0 to 7.

Then, the structural anisotropy of the cancellous bone portion is determined by a tensor analysis as described bellow. The binary image corresponding to the cancellous bone portion provided by the invention is processed to provide a thinned image. The following operation is carried out on the each pixel of the thinned image. With reference to FIG. 15, a schematic enlarged illustration of an image is shown, in which a pixel of interest is indicated by "$P_{ior}$", and the adjacent pixels surrounding the pixel of interest Pior are referred to $P_i$, i=0 to 7, respectively, in which the adjacent pixels $P_i$, i=0, 1, 3, 4, 5, and 7, are positioned in the X direction relative to the pixel of interest $P_{ior}$, and the adjacent pixels $P_i$, i=1, 2, 3, 5, 6 and 7, are positioned in the Y direction relative to the pixel of interest $P_{ior}$.

Figure 16:
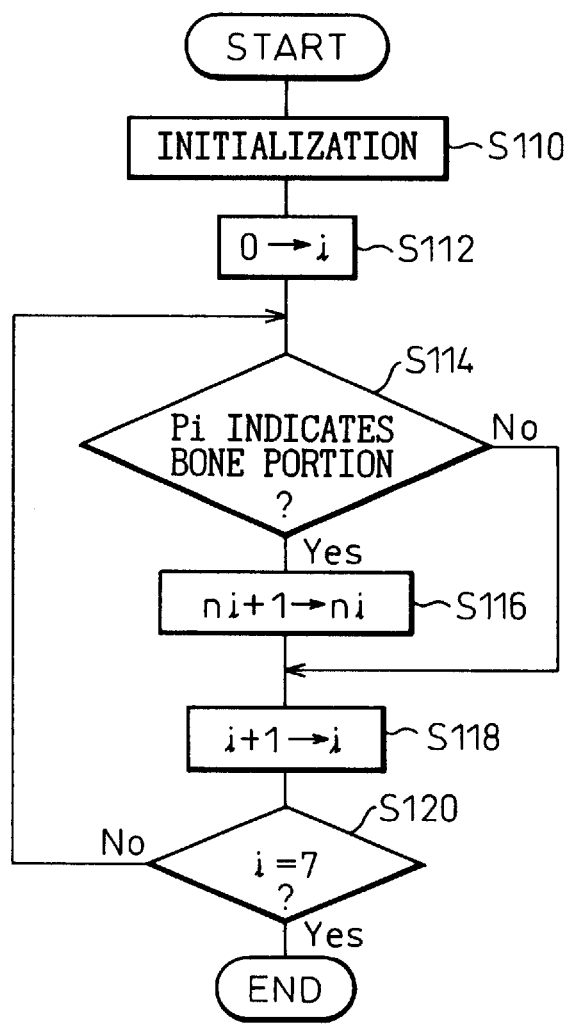
FIG. 16 is a flow chart for determining the structural anisotropy of the cancellous bone portion by a tensor analysis according to the invention.

FIG. 16 illustrates a flow chart for determining the structural anisotropy of the cancellous bone portion according to the invention. In step S110 in FIG. 16, an initialization is carried out so that zero (0) is input into adjacency parameters $n_0$ to $n_7$ which associate to the adjacent pixels $P_0$ to $P_7$, respectively. Thus, adjacency parameters $n_i$, i=0, 1, 3, 4, 5, and 7, are associated in the X orientation relative to the pixel of interest $P_{ior}$, and the adjacency parameters $n_i$, i=1, 2, 3, 5, 6 and 7, are associated in the Y orientation relative to the pixel of interest $P_{ior}$.

In step S112, zero (0) is input into parameter i. In step S114, it is determined whether the adjacent pixel $P_i$ indicates the bone portion or not. If so, one (1) is added to the parameter $n_i$ (step S116), and the routine goes to step S118. In step S114, if the adjacent pixel $P_i$ does not indicate the bone portion, the routine also goes to step S118. In step S120, it is determined whether i=7 or not. If not, the steps S114 to S118 are carried out again. If i=7 in step S120, that is, when the above operation has been carried out on all of the adjacent pixels $P_0$ to $P_7$ surrounding the pixel of interest $P_{ior}$, the process is repeated again from step S112 until the process is carried out on all of the pixels of interest. The tensor ($N_x$, $N_y$) is defined as follows.

$$N_x = (n_0 + n_1 + n_3 + n_4 + n_5 + n_7)/2 \tag{18}$$

$$N_y = (n_1 + n_2 + n_3 + n_5 + n_6 + n_7)/2 \tag{19}$$

Figure 17:
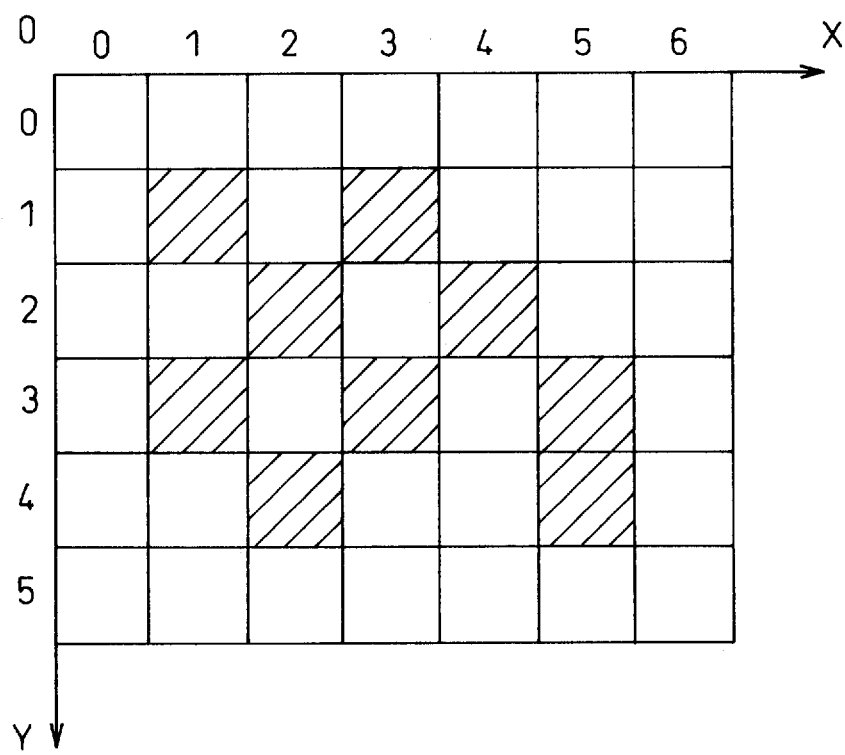
FIG. 17 is an illustration of a simple example of a binary image for explaining the tensor analysis according to the invention.

With Reference to FIG. 17, a simple example of a binary image is shown, in which the adjacency parameters are calculated by the above operation as follows.

|        | i = 0 | 1 | 2 | 3 | 4 | 5 | 6 | 7 |
|--------|-------|---|---|---|---|---|---|---|
| $P_{11}$ | 0 | 0 | 0 | 0 | 0 | 0 | 0 | 1 |
| $P_{31}$ | 0 | 0 | 0 | 0 | 0 | 1 | 0 | 1 |
| $P_{22}$ | 0 | 1 | 0 | 1 | 0 | 1 | 0 | 1 |
| $P_{42}$ | 0 | 0 | 0 | 1 | 0 | 1 | 0 | 1 |
| $P_{13}$ | 0 | 1 | 0 | 0 | 0 | 0 | 0 | 1 |

-continued

|        | i = 0 | 1 | 2 | 3 | 4 | 5 | 6 | 7 |
|--------|-------|---|---|---|---|---|---|---|
| $P_{33}$ | 0 | 1 | 0 | 1 | 0 | 1 | 0 | 0 |
| $P_{53}$ | 0 | 0 | 0 | 1 | 0 | 0 | 1 | 0 |
| $P_{24}$ | 0 | 1 | 0 | 1 | 0 | 0 | 0 | 0 |
| $P_{54}$ | 0 | 0 | 1 | 0 | 0 | 0 | 0 | 0 |
| $n_i$    | 0 | 4 | 1 | 5 | 0 | 4 | 1 | 5 |

Thus, the tensor in the case of FIG. 17 is calculated as follows.

$N_x = 9$ and $N_y = 10$

Further, in consideration of MWT, a relative tensor is provided by ($NN_x$, $NN_y$).

where $$NN_x = (MWT \times N_x)/(N_x^2 + N_y^2)^{1/2} \tag{20}$$

$$NN_y = (MWT \times N_y)/(N_x^2 + N_y^2)^{1/2} \tag{21}$$

The relative tensor indicates the relative strength of the cancellous bone portion as well as the degree of the structural anisotropy of the cancellous bone portion. That is, by consideration of MWT, the length of the relative tensor ($NN_x$, $NN_y$) indicates the relative strength of the cancellous bone portion, and the ratio of $NN_x$ and $NN_y$ indicates the structural anisotropy of the cancellous bone portion.

It will also be understood by those skilled in the art that the forgoing description is a preferred embodiment of the disclosed device and that various changes and modifications may be made without departing from the spirit and scope of the invention.

We claim:

1. A method of processing a sectional bone image for a morphometry of a bone which includes a cortical bone portion and a cancellous bone portion, comprising the steps of:

providing a binary image of a bone section;

providing a subject region on the binary image to producing a ROI image by extracting pixels corresponding to the bone portion from the binary image within the subject region, onto which ROI image the morphometry is carried out;

determining a series of pixels along the center line extending along the cortical bone portion in the ROI image; and providing a hemi-cortical bone image which has a wall thickness substantially half of the real wall thickness of the cortical bone portion by using the center line determined in the preceding step.

2. The method of processing a sectional bone image according to claim 1, further comprising a step of providing a template image for the cortical bone portion by executing expanding operations on the hemi-cortical bone image a predetermined number of times.

3. The method of processing a sectional bone image according to claim 2, further comprising a step of extracting the common pixels between the ROI image and the template image to provide an image substantially corresponding to the cortical bone portion.

4. The method of processing a sectional bone image according to claim 3, further comprising a step of eliminating the image corresponding to the cortical bone image from the ROI image to provide an image corresponding to the cancellous bone portion.

5. The method of processing a sectional bone image according to claim 4, further comprising the step of executing a tensor analysis on the image corresponding to the cancellous bone portion to determine the structural anisotropy in the cancellous bone.

6. The method of processing a sectional bone image according to claim 2, further comprising a step of eliminating the pixels, which are common to the ROI image and the template image, from the ROI image to provide an image corresponding to the cancellous bone portion.

7. The method of processing a sectional bone image according to claim 6, further comprising a step of eliminating the image corresponding to the cancellous bone portion from the ROI image to provide an image corresponding to the cortical bone portion.

8. The method of processing a sectional bone image according to claim 6, further comprising the step of executing a tensor analysis on the image corresponding to the cancellous bone portion to determine the structural anisotropy in the cancellous bone.

9. The method of processing a sectional bone image according to claim 1, in which the series of pixels along the center line extending along the cortical bone portion is determined by executing a thinning process on the ROI image.

10. The method of processing a sectional bone image according to claim 1, in which the hemi-cortical bone image is provided by the steps of:

executing a filling hole operation on the center line image to provide a solid image; and removing the pixels of the solid image from the ROI image.

11. A method of processing a sectional bone image according to claim 1, in which the binary image is of a vertebral body which includes a cortical bone portion and a cancellous bone portion, and the region of interest is provided by the steps of:

determining the axis of inertia of the binary image of a vertebral body;

determining pixels corresponding to the vertebral canal within the binary image of a vertebral body;

determining a respective length relating to the extension of the vertebral canal; and providing a subject region on the binary image based on the representative length to extract pixels corresponding to the bone portion within the subject region whereby the region of interest is defined on the binary image by the extracted pixels.

12. A method of processing a sectional bone image according to claim 11, in which the step of determining the representative length includes steps of providing the smallest rectangle enclosing the pixels of the vertebral canal;

determining a pair of fillet coordinates which are at the corners on one of the diagonals of the smallest rectangle enclosing the vertebral canal; and determining the distances between the axis of inertia and the fillet coordinates as the representative length.

13. A method of processing a sectional bone image according to claim 11, in which the step of determining the representative length includes steps of determining the maximum and minimum x and y coordinates of the pixels which belong to the vertebral canal; and determining the distances between the axis of inertia and the points defined by the maximum and minimum x and y coordinates as the representative length.

14. The method of processing a sectional bone image according to claim 11, further comprising a step of providing a template image for the cortical bone portion by executing expanding operations on the hemi-cortical bone image a predetermined number of times.

15. The method of processing a sectional bone image according to claim 11, in which a series of pixels along the center line extending along the cortical bone portion is determined by executing a thinning process on the ROI image.

16. The method of processing a sectional bone image according to claim 11, in which the hemi-cortical bone image is provided by the steps of:

providing an operation region to enclose the ROI image so that the operation region including the largest and second largest background portion at the either side of the ROI image bounds the center line pixels;

determining the largest and second largest backgrounds within the operation region;

determining first pixels which are common with the largest hole image and the ROI image to provide a first hemi-cortical bone image;

determining second pixels which are common with the second largest hole image and the ROI image to provide a second hemi-cortical bone image; and combining the first and second hemi-cortical images to provide the hemi-cortical bone image.

17. The method of processing a sectional bone image according to claim 11, further comprising a step of extracting the common pixels between the ROI image and the template image to provide an image substantially corresponding to the cortical bone portion.

18. The method of processing a sectional bone image according to claim 17, further comprising a step of eliminating the image corresponding to the cortical bone portion from the ROI image to provide an image corresponding to the cancellous bone portion.

19. The method of processing a sectional bone image according to claim 18, further comprising the step of executing a tensor analysis on the image corresponding to the cancellous bone portion to determine the structural anisotropy in the cancellous bone.

20. The method of processing a sectional bone image according to claim 11, future comprising a step of eliminating the pixels, which are common to the ROI image and the template image, from the ROI image to provide an image corresponding to the cancellous bone portion.

21. The method of processing a sectional bone image according to claim 20, further comprising a step of eliminating the image corresponding to the cancellous bone portion from the ROI image to provide an image corresponding to the cortical bone portion.

22. The method of processing a sectional bone image according to claim 20, further comprising the step of executing a tensor analysis on the image corresponding to the cancellous bone to determine the structural anisotropy in the cancellous bone.

* * * * *